(12) United States Patent
Bonacci et al.

(10) Patent No.: US 10,188,237 B2
(45) Date of Patent: Jan. 29, 2019

(54) MULTISIZE CAPSULE HANDLING WITH SERIAL ACTUATION

(71) Applicant: NESTEC S.A., Vevey (CH)

(72) Inventors: Enzo Bonacci, Savigny (CH); Jean-Marc Flick, Pomy (CH)

(73) Assignee: Nestec S.A., Vevey (CH)

( * ) Notice: Subject to any disclaimer, the term of this patent is extended or adjusted under 35 U.S.C. 154(b) by 4 days.

(21) Appl. No.: 15/301,177

(22) PCT Filed: Apr. 7, 2015

(86) PCT No.: PCT/EP2015/057432
§ 371 (c)(1),
(2) Date: Sep. 30, 2016

(87) PCT Pub. No.: WO2015/155145
PCT Pub. Date: Oct. 15, 2015

(65) Prior Publication Data
US 2017/0013993 A1    Jan. 19, 2017

(30) Foreign Application Priority Data

Apr. 8, 2014 (EP) ...................................... 14163810

(51) Int. Cl.
*A47J 31/36* (2006.01)
*A47J 31/06* (2006.01)

(52) U.S. Cl.
CPC ....... *A47J 31/3633* (2013.01); *A47J 31/0647* (2013.01); *A47J 31/3638* (2013.01); *A47J 31/3676* (2013.01)

(58) Field of Classification Search
CPC ................ A47J 31/3633; A47J 31/3676; A47J 31/3638; A47J 31/0647
See application file for complete search history.

(56) References Cited

U.S. PATENT DOCUMENTS

2001/0011502 A1    8/2001    Bonanno
2007/0104837 A1*   5/2007    Yoakim ............... A47J 31/0668
                                                        426/77

FOREIGN PATENT DOCUMENTS

CN        101869433        10/2010
CN        102178456         9/2011
(Continued)

*Primary Examiner* — Ryan J Walters
(74) *Attorney, Agent, or Firm* — K&L Gates LLP

(57) ABSTRACT

A machine (1) comprises a frame (1') and a capsule handling device (1") mounted in and/or on the frame (1'). The device (1") has a first part (10) and a second part (20) that is movable relatively to the frame (1') from a transfer position for inserting and/or removing said capsule (2a,2b) to an extraction position for extracting such capsule and vice versa. The second part (20) comprising: a capsule receptacle (21) delimiting a cavity (21') for receiving such capsule (2a,2b) and for forming in the extraction position an extraction chamber (21") with the first part (10); and a first portion (21a) and a second portion (21b) that are relatively movable between a first relative position and a second relative position to change at least one dimension (21da,21db,21ha, 21hb) of the cavity (21') and of the extraction chamber (21"). The device (1") further comprises an actuator (30,300) connected to the second part (20) for driving the movable second part (20) between the transfer position and the extraction position. The actuator (30,300) is further connected to the first and/or second portions (21a,21b) of the second part (20) to relatively move the first and second portions (21a,21b) between their first and second relative positions.

10 Claims, 16 Drawing Sheets

(56) References Cited

FOREIGN PATENT DOCUMENTS

| | | |
|---|---|---|
| WO | 2006066621 | 6/2006 |
| WO | 2008096385 | 8/2008 |
| WO | 2013111088 | 8/2013 |
| WO | 2014016741 | 1/2014 |

\* cited by examiner

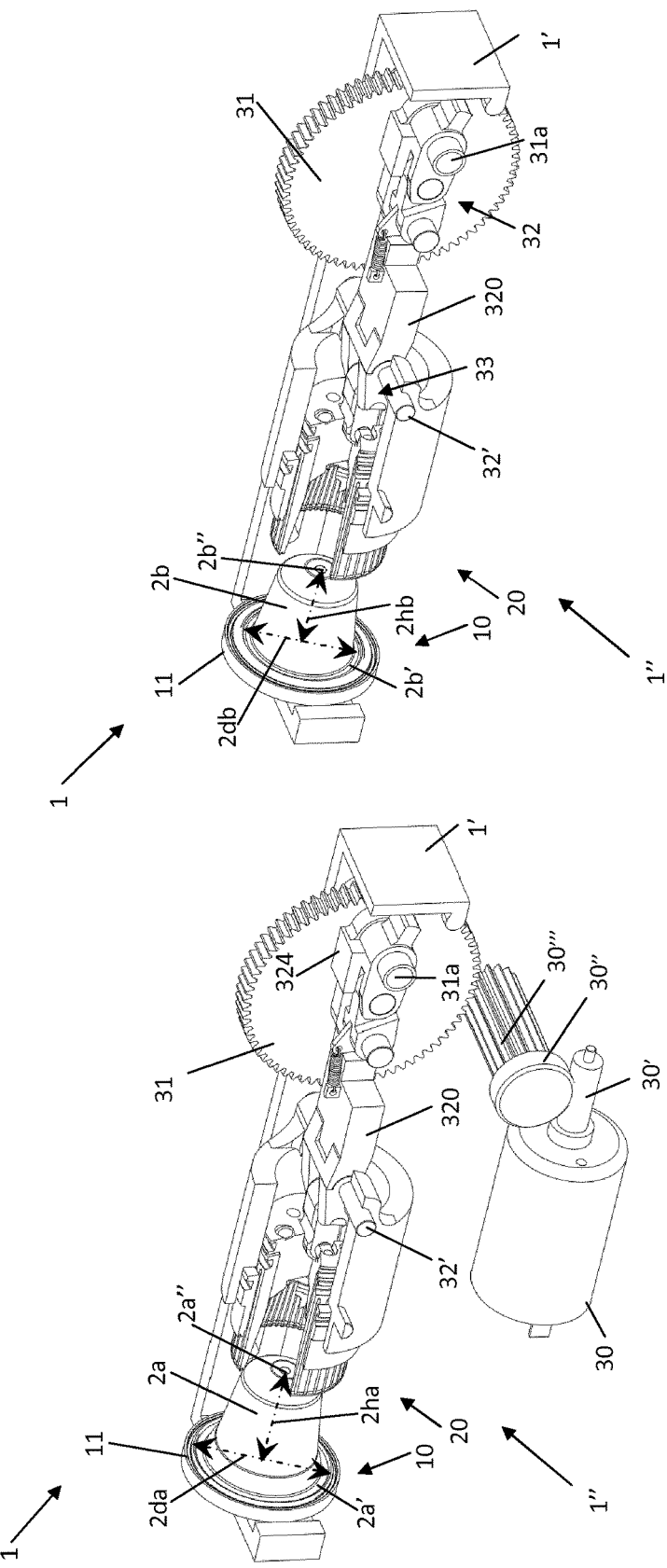

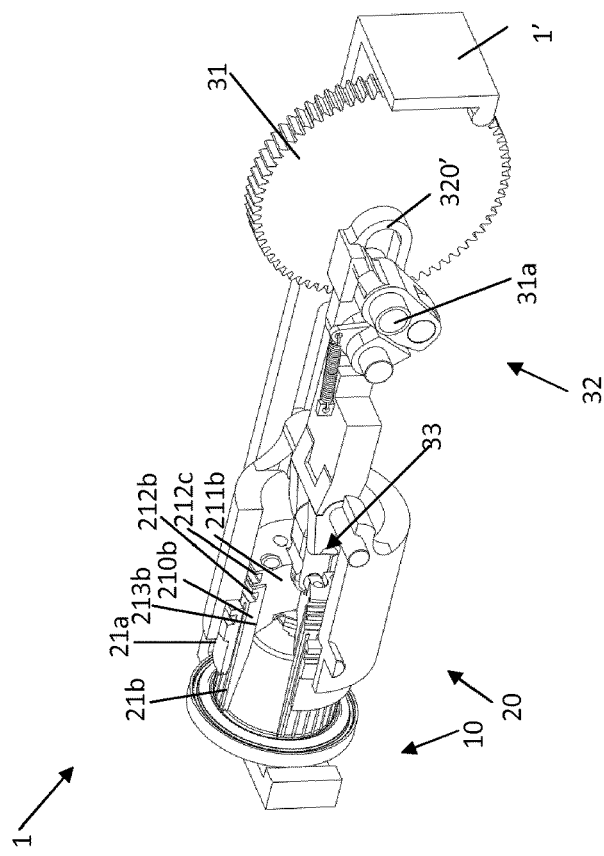
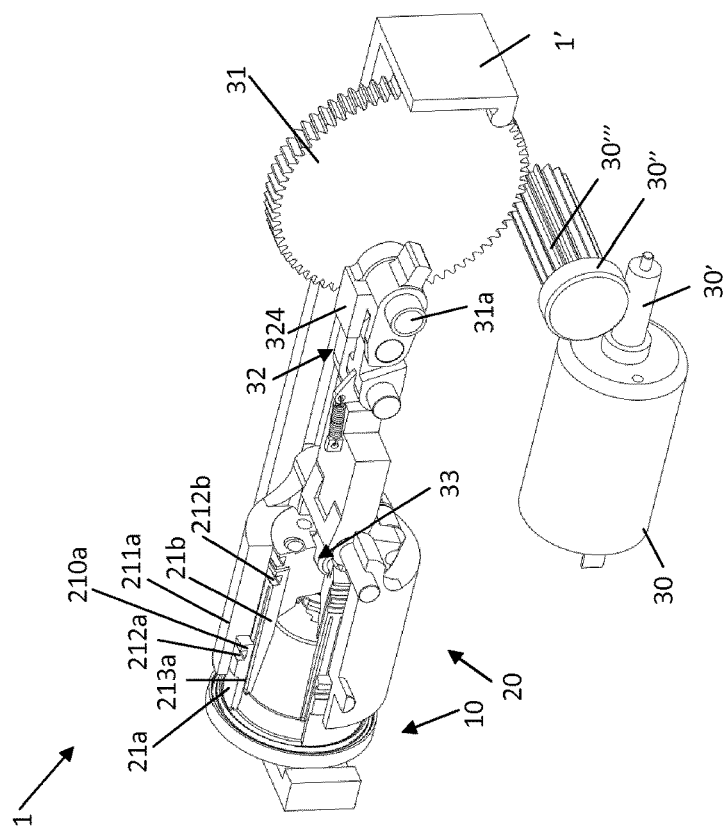
Fig. 5b
Fig. 5a

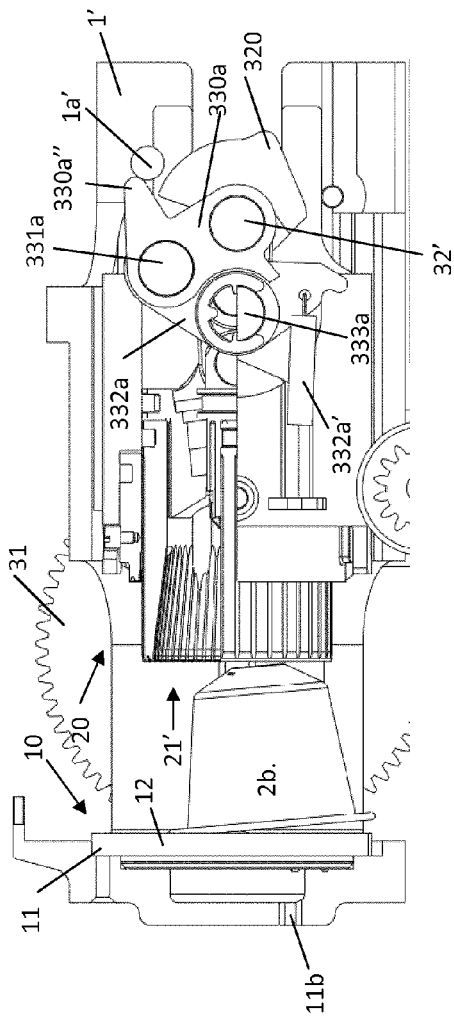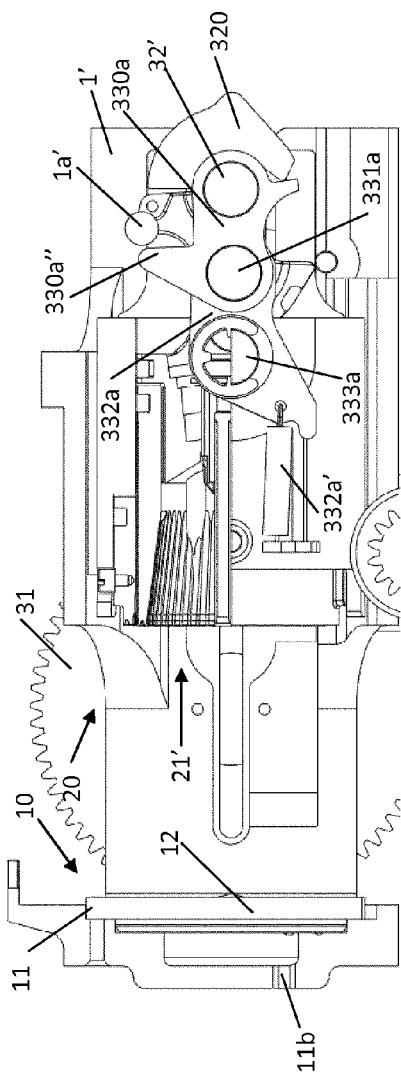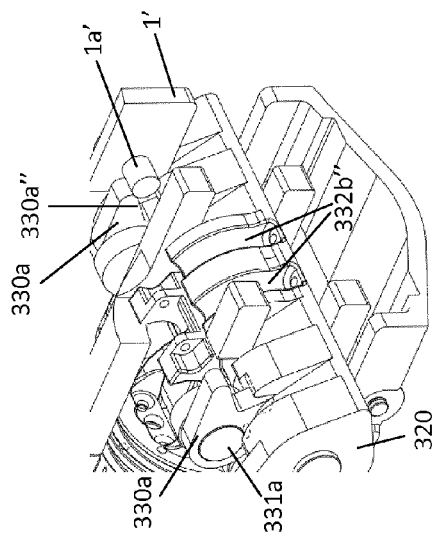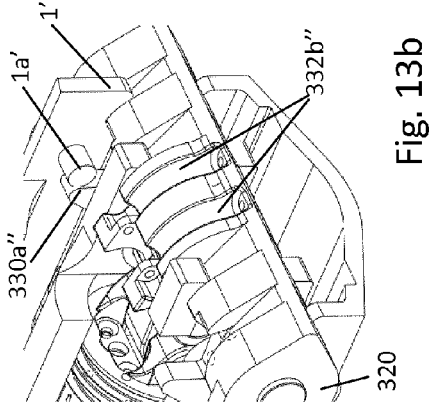

US 10,188,237 B2

MULTISIZE CAPSULE HANDLING WITH SERIAL ACTUATION

CROSS REFERENCE TO RELATED APPLICATIONS

The present application is a National Stage of International Application No. PCT/EP2015/057432, filed on Apr. 7, 2015, which claims priority to European Patent Application No. 14163810.6, filed Apr. 8, 2014, the entire contents of which are being incorporated herein by reference.

FIELD OF THE INVENTION

The field of the invention pertains to a device for handling capsules, in particular handling device for beverage machines using capsules of an ingredient of the beverage to be prepared. The invention also relates to a combination of the device and the capsule, to a method of handling the capsule with the device and to a use of a capsule for the device.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight or air-permeable packaging, e.g. plastic, aluminium, recyclable and/or biodegradable packagings, and of any shape and structure, including soft pods or rigid cartridges containing the ingredient.

BACKGROUND ART

One problem encountered is the positioning of the capsule in the device and the closing of the latter around the capsule to perform the brewing process. The capsule usually has to be positioned by the user on a capsule support or in a housing, then the device is closed manually or automatically around the capsule.

It is important to correctly position the capsule so that the device closes correctly around the latter and a good seal is thus achieved to ensure good conditions of extraction. Bad positioning may damage the capsule, and thus affect the conditions of extraction. The loading of the capsule must also be easy, without trial and error as to the correct position of the capsule in the device. The loading must also be as rapid as possible and not require excessive manipulations. Hence, devices exist that propose the insertion of the capsule in a vertical plane and the movement of the extraction or infusion parts along a horizontal plane around the capsule. Such systems have the advantages of allowing a loading from the top piggy-bank fashion, and makes for rapid loading. The positioning of the capsule is then taken over by the movement of a movable part that pushes the capsule against another part such as a water heater. However, these devices are complex to produce and are not suitable for low-cost and therefore entry-level coffee machines for the consumer market. They are therefore usually intended for the business market such as restaurants, bars or communities. For example, patent application WO 98/47418 relates to a device for the extraction of pre-measured inserts in which the inserts are inserted vertically and are extracted horizontally. The disadvantage of this device is that it comprises two movable parts for the extraction, which makes the mechanical principle more complicated.

WO 2005/004683 relates to a capsule brewing device comprising: a first part; a second part that can be moved relative to the first part; a housing for the capsule and defining, in a closed position of the movable part against the fixed part, an extraction position of the capsule along an axis in the housing; an insertion and positioning part comprising means for guiding the capsule arranged so as to insert the capsule by gravity and position such capsule in an intermediate position; a drink pouring system; and the second movable part is so arranged and constructed to move the capsule from the intermediate position into the extraction position when the device is closed.

EP 1 721 553 discloses a brewing unit for coffee machines using capsules. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a capsule to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The capsule is passed through the external housing to the infusion chamber via a rigid capsule feed channel and then the capsule is transferred into the infusion chamber by an external bushing on the movable rear part of the brewing unit which is provided with a cam-like path for moving the rear part. This arrangement involves several problems. The capsule must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the capsule, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee capsule into the machine. The drawer is movable between an open and a closed position and has two capsule half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a capsule therein. When slid into the machine, the drawer can be moved upwards towards a fixed capsule cage for form a brewing chamber for a capsule. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 7,131,369, US 2005/0106288, US 2006/0102008, WO 2005/002405, WO 2005/016093, WO 2006/005756, WO 2006/066626, WO 2007/135136 and EP2013180164.9, EP2013180165.6 and EP2013180166.4.

Devices arranged to handle ingredient capsules of different sizes are disclosed in EP 1 208 782 and in WO 2012/123440. Further devices for handling capsules of different sizes are disclosed in PCT/EP13/064001, PCT/EP13/064003, PCT/EP13/070756, PCT/EP13/070780, PCT/EP13/070866, PCT/EP13/071453, PCT/EP13/077272, EP20 13196040.3, EP2013196041.1 and EP2013196042.9.

There is still a need to provide a device for handling reliably capsules, e.g. capsules of different sizes.

SUMMARY OF THE INVENTION

It is an object of the present invention to provide a machine for handling capsules, e.g. ingredient capsules to prepare beverages.

In particular, the invention relates to a machine comprising a frame, such as a frame supporting a control unit and/or a machine's fluid circuit.

The control unit typically includes a controller or processor and/or a printed circuit board and/or and electric power management and/or a user-interface. The machine's fluid circuit may include one or more fluid conduits, a water source, e.g. a tank and/or connector to the city water distribution, a pump and a thermal conditioner such as a heater and/or a cooler. The control unit is typically arranged to control the machine's fluid circuit and can be connected to a pump, a thermal conditioner, a sensors such as a temperature sensor, a flowmeter, a pressure sensor, a level sensor (e.g. in a tank). When present, a motor is typically connected to the control unit. The control unit may also be connected to one or more position and/or motion sensors associated with any movable part of the machine, for instance of the capsule handling device.

Examples of fluid circuits are disclosed in WO 2009/074550 and in WO 2009/130099.

A suitable thermal conditioner may include a heater and/or a cooler such as a heater that is a thermoblock or an on demand heater (ODH), for instance an ODH type disclosed in EP 1 253 844, EP 1 380 243 and EP 1 809 151.

Suitable control unit configurations and connections are for example disclosed in WO 2009/043851 and WO 2009/043865.

The machine further comprises a capsule handling device mounted in and/or on the frame.

For instance, the device has an outlet for dispensing an extract of a capsule handled by the device. The device may include a fluid inlet connected to a machine's fluid circuit for circulating a fluid into such capsule.

The capsule handling device comprises:
  a first part, such as a first part that has a support with an outlet for letting out an extract of the capsule e.g. via or along an opening device such as via an opening plate, the first part being optionally fixed to the frame or movable thereto;
  a second part that is movable relatively to the frame from a transfer position for inserting and/or removing the capsule to an extraction position for extracting such capsule and vice versa.

The second part comprises:
  a capsule receptacle delimiting a cavity for receiving such capsule and for forming in the extraction position an extraction chamber with the first part; and
  a first portion and a second portion that are relatively movable between a first relative position and a second relative position to change at least one dimension of the cavity and of the extraction chamber; and
  optionally an inlet for letting a fluid into the chamber to the capsule in the chamber e.g. via or along an opening device such as along one or more piercing elements in the cavity;

In the context of the present invention, the "first part" and the "second part" may each refer to a single component typically assembling different functions, e.g. mechanical guiding function, mechanical holding function, mechanical piercing function, flow function, pressure function, etc. . . . , and/or refer to a plurality of components associating the desired function(s). The first part of the handling device is movable relatively to the second part and relatively to the frame, e.g. a stationary structure. The first part can be arranged to move in a direction, e.g. an arched and/or linear direction.

Optionally at least one of the first and second portions comprises a base and a dimensional adjuster movably mounted to the base, such as an anti-backlash arrangement for urging the first and second parts together and/or against the capsule e.g. for sealing. For instance, the dimensional adjuster is actuated hydraulically e.g. via a hydraulic circuit that comprises a fluid passage and/or one or more sealing elements such as a hydraulic circuit that is connected to the machine's fluid circuit e.g. to the fluid inlet of the device. Examples of such dimensional adjusters are disclosed in WO 2008/037642.

The handling device further comprises an actuator, such as a motor or a handle, connected to the second part for driving the movable second part between the transfer position and the extraction position, for instance an actuator that is fixed in or to the frame.

The first part may be fixed to the frame or movable thereto. When the first part is movable relative to the frame, the first part can (also) be driven by the same actuator, e.g. via a cam-arrangement, in line with the teaching disclosed in concurrently filed application EP 2014163793.

Examples of suitable motorized actuators are disclosed in EP 1767129, WO 2012/025258, WO 2012/025259 and WO 2013/127476. Example of suitable handles are disclosed in WO 2005/004683, WO2007/135136 and WO 2009/043630.

The handling device may include or delimit or be associated with a capsule feed channel, e.g. a chimney, for guiding the capsule, e.g. guiding the capsule by gravity, to inbetween the first and second parts in the transfer position and immobilize the capsule therebetween to then form the extraction chamber for extracting the capsule. Examples of such capsule feed channels and immobilization systems are disclosed in EP2013196041 and EP2013196042.

Upon extraction, the capsule can be removed from the capsule handling device by using a suitable capsule remover, e.g. as disclosed in EP2013196040.

Optionally, the first part has a support with an outlet for letting out an extract of the capsule e.g. via or along an opening device, such as via an opening plate. Such outlet may be arranged for dispensing beverage to a user, e.g. to an area for placing a user-cup or a user-mug. The dispensing area may be delimited at the bottom by a support surface for holding a user cup or mug. Such support surfaces are well known in the art, e.g. as disclosed in EP 1 867 260 and WO 2009/074557.

Optionally, the second part has an inlet for letting a fluid into the chamber to the capsule, e.g. via or along an opening device such as along one or more piercing elements in the cavity.

When closed capsules are used, first and second parts may include a capsule opener such as piercing elements, e.g. blades, and/or a tearing tool, e.g. an opening plate, for example with a tearing profile, for instance as known from Nespresso™ machines. See for example EP 0 512 468, EP 0 512 470, PCT/EP2013/073530, EP2013180164.9 and EP2013180166.4 and EP2013180165.6.

In accordance with the invention, the actuator is further connected to the first and/or second portions of the second part to relatively move the first and second portions between their first and second relative positions. Optionally the actuator drives the second part between its transfer and extraction positions and drives the first and second portions of the second part between their first and second positions: simultaneously; or sequentially; or partly simultaneously and partly sequentially.

Hence, a single actuator, e.g. a single motor or a single handle, may actuate the second part between the transfer and the extraction position as well as the first and second portions of the second part between their first and second relative positions.

The actuator of the capsule handling device can be a user-handle e.g. a pivotable user-handle. The user-handle can be operable into two different directions to move the first part from the transfer position to the extraction position and, depending on the operating direction of the handle, to not drive the portions of the second part relatively to one another or to relatively drive the first and second portions to the first relative position or the second relative position or even to an intermediate relative position.

In a particular embodiment, the device is arranged for handling capsules containing at least one ingredient e.g. to prepare a beverage from such ingredient in the beverage machine. For instance, the machine is a coffee, tea, chocolate, cacao, milk or soup preparation machine. The machine may be arranged for preparing within the extraction chamber a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . . . For example, a coffee machine may be configured for dispensing espressos, e.g. an adjustable volume of 20 to 60 ml per serving, and/or for dispensing lungos, e.g. a volume in the range of 70 to 150 ml per serving.

Typically, the ingredient is contained in a capsule having an aluminium or plastic or paper enclosure and supplied within the capsule to the processing module of the machine. Generally speaking, the capsule can be of the type described above under the header "field of the invention". Suitable capsules are for example disclosed in EP 0 512 468, EP 0 512 470 and EP 2 068 684.

The capsule may have a flange, e.g. a rim, and a receptacle that is symmetric or asymmetric relative to the flange, conical or frusto-conical or cylindrical or spherical or hemispherical or frusto-spherical, for holding the capsule content, such as a beverage ingredient, e.g. ground coffee, tea or cacao or another beverage ingredient. The flange may be deformed while it is handled by the device, e.g. the flange may be urged from a position in which it is immobilized by stop means beyond such stop means. The stop means for stopping the capsule inbetween the first and second parts can be arranged so that when the first part is moved from the transfer position to the extraction position the capsule can be taken over (and usually secured) by the first and second parts.

The capsule handling device can comprise a mechanical transmission connecting the actuator to the second part and to the first and second portions of the second part for driving:
the second part between the transfer position and the extraction position; and
the first and/or second portions of the second part to relatively move the first and second portions between their first and second relative positions.

The mechanical transmission may be connected to the actuator by an actuator transmission. For instance, when the actuator is a motor, the actuator transmission may include at least one of: axles, pinions e.g. toothed pinions, wheels e.g. toothed wheels, racks e.g. toothed racks, worm drives, knuckle joint arrangements, cam arrangements and belts. When the actuator is a handle with a grip, the transmission may include at least one of levers, axles, pinions e.g. toothed pinions, wheels e.g. toothed wheels, racks e.g. toothed racks, worm drives, knuckle joint arrangements, cam arrangements and belts.

The mechanical transmission may include: a primary mechanical transmission for driving the second part between the transfer position and the extraction position; and a secondary mechanical transmission for driving the first and/or second portions of the second part to relatively move the first and second portions between their first and second relative positions. Optionally the secondary mechanical transmission is driven by the primary mechanical transmission, the secondary mechanical transmission being for instance serially mounted on the primary mechanical transmission.

The primary mechanical transmission can include a closure distance shifter for adjusting a travelling distance of the second part between the transfer position and the extraction position depending on the relative position of the first and second portions when the second part is in the extraction position.

The closure distance shifter may connect the primary mechanical transmission to a drive wheel, such as a drive wheel actuated by the actuator e.g. via the abovementioned actuator transmission. Optionally the shifter is connected via a pivot connector to the drive wheel and/or via a pivot connector to a transmission rod of the primary mechanical transmission.

The closure distance shifter can interact with a slide of a transmission rod of the primary mechanical transmission.

The closure distance shifter may be associated with at least one of:
- a return spring, such as a return-spring mounted to a transmission rod of the primary mechanical transmission; and
- a direction discriminator, such as a discriminator fixed to a transmission rod of the primary mechanical transmission, to block and unblock the closure distance shifter depending on the relative position of the first portion and a second portion when the second part is in the extraction position.

The closure distance shifter can comprise a knuckle-joint arrangement.

The primary mechanical transmission can have a dimensionally constant drive structure to maintain a constant travelling distance of the second part between the transfer position and the extraction position irrespectively of the relative position of the first and second portions when the second part is in the extraction position.

The primary transmission can be connected to a drive wheel, such as a drive wheel actuated by the actuator e.g. via the abovementioned actuator transmission. For example, the primary transmission is connected via a pivot connector to the drive wheel.

The primary transmission may comprise a connecting rod or wheel, such as a pair of connecting rods or wheels, e.g. a rod or wheel connecting a drive axle to which the second portion is directly or indirectly, e.g. via the secondary mechanical transmission, connected to be driven thereby.

The primary transmission can have a mechanical input that is driven in rotation about a drive arc and a mechanical output that is moved in translation.

The secondary mechanical transmission may comprise a relative position shifter for relatively moving the first and second portions.

The relative position shifter may connect the primary mechanical transmission, e.g. an output of the primary mechanical transmission, to the first and second portions such as via pivoting axis mounted to the first and second portions.

The relative position shifter can be associated with a first travel stop for stopping a travel of the first and second portions when they reach their first relative position and/or a second travel stop for stopping a travel of the first and second portions when they reach their second relative position.

The relative position shifter may be associated with a direction discriminator, such as a travel stop arrangement formed on a transmission rod of the primary mechanical transmission and on a transmission rod of the secondary mechanical transmission, to block and unblock the relative position shifter depending on the required relative position of the first portion and the second portion when the second part is in the extraction position.

The relative position shifter can comprise a knuckle-joint arrangement driving the first and second portions between their first and second relative positions.

The relative position shifter can comprise a camshaft that drives (directly or indirectly) the first and/or the second portion into their first relative position or their second relative position. For instance, when the movable part is in the transfer position, the first and second portions can be in an intermediate relative positions and can be driven to their first relative position or their second relative position, depending on the direction of pivoting of the cam shaft, when the second part is brought from the transfer position to the extraction position.

Any of the abovementioned mechanical transmission and shifter, i.e. the primary mechanical transmission, the secondary mechanical transmission, the first and second secondary mechanical transmission, the closure distance shifter and the relative position shifters, may include a cam arrangement. The cam arrangement may comprise a driving guide member driven by the actuator, e.g. in rotation about a distant axis, along a guide path of the corresponding mechanical transmission or shifter. The cam arrangement can comprise a driving member delimiting a guide path driven by the actuator, e.g. in rotation about a distant axis, along a guide member of the corresponding mechanical transmission or shifter.

The secondary mechanical transmission can comprise: a first relative position shifter connected to and driving the first portion; and a second relative position shifter connected to and driving the second portion. These first and second relative position shifters are arranged to relatively move the first and second portions. One or both relative position shifters can be connected to the primary mechanical transmission, e.g. to an output of the primary mechanical transmission. One or both relative position shifters may be associated with a first end of a travel stop for stopping a travel of the first and/or second portions when they reach their first relative position and/or a second travel stop for stopping a travel of the first and/or second portions when they reach their second relative position. One or both relative position shifters may be associated with a direction discriminator, such as a travel stop arrangement formed on a transmission rod of the primary mechanical transmission and on a transmission rod of the secondary mechanical transmission, to selectively drive or not drive the relative position shifter depending on the required relative position of the first and second portions when the second part is in the extraction position. One or both relative position shifters may include a knuckle-joint arrangement driving the first and/or second portions between their first and second relative positions. Each relative position shifter can be in a serial mechanical configuration between an output of the first mechanical transmission and an input of the portion associated with the shifter. The first relative position shifter may be mounted in parallel to the second relative position shifter on the first mechanical transmission.

The actuator may have a drive output, such as a rotor or an axle, that operates selectively in a first direction and in a second direction different to the first direction. Such rotor or axle may rotate selectively in a clockwise direction and in a counter-clockwise direction.

Optionally, the actuator is controlled to operate the drive output in the first direction or in the second direction via a user-interface or via a sensor arranged to sense a characteristic of a capsule to be handled by the device, such as a size and/or a type of the capsule.

A manual or an automatic capsule recognition or sensing system may be used to parameterize and adjust the processing of the capsule, e.g. to adjust the extraction chamber, automatically in line with the recognized or sensed capsule type or size. Suitable automatic capsule sensing and recognition systems are for example disclosed in WO 2012/123440 and PCT/EP13/070167.

The capsule may be fed to the handling device from a capsule loader, e.g. an automatic capsule loader such as a capsule loader that is driven by the device's actuator. Suitable capsule loaders are for example disclosed in PCT/EP13/064001, PCT/EP13/064003 and EP2013196594.

The second part can be moved from the transfer position to the extraction position by the actuator via the primary mechanical transmission irrespectively of the first and second directions of operation of the drive output while the first and second portions of the second part are, via the secondary mechanical transmission, either:

relatively moved to their first relative position or maintained in their first relative position or relatively moved to their second relative position or maintained in their second relative position, depending on the direction of operation of the drive output.

The second part can be moved from the extraction position to the transfer position by the actuator irrespectively of the first and second directions of operation of drive output while the first and second portions of the second part are relatively moved to an intermediate relative position by the actuator either from their first relative position or from their second relative position irrespectively of the first and second directions of operation of the drive output or by reversing the direction operation of the drive output vis-à-vis the direction of operation for bringing the first and second portions into their first or second relative position and the second part into the extraction position.

At least one of the primary mechanical transmission and the secondary mechanical transmission, e.g. a first and/or a second secondary mechanical transmission, is dimensionally either blocked or unblocked depending on the direction of operation of the drive output when the second part is moved from the transfer position to the extraction position. For instance, the primary mechanical transmission comprises a closure distance shifter which is either blocked or unblocked depending on the direction of operation of the drive output when the second part is moved from the transfer position to the extraction position. For instance, the secondary mechanical transmission has a relative position shifter which is either blocked or unblocked depending on the direction of operation of the drive output when the second part is moved from the transfer position to the extraction position. For instance, the secondary mechanical transmission has a first relative position shifter and a second relative position shifter that are alternatively blocked and unblocked depending on the direction of operation of the drive output when the second part is moved from the transfer position to the extraction position.

The mechanical transmission can comprise an automatic return means, such as a bias element, such as an automatic return spring, for returning a mechanical transmission to a reference configuration, such as a primary or a secondary mechanical transmission or a first or second secondary mechanical transmission, e.g. a closure distance shifter or a relative position shifter or first or second relative position shifter; and/or a retainer, such as a protruding face, interfering with a counter-retainer, such as a hook, e.g. a counter-retainer fixed to the frame, for bringing the mechanical transmission to a reference configuration.

The handling device can be configured to handle a first capsule of first dimensions as well as a second capsule of second dimensions different to the first dimensions, for instance different first and second capsule diameters and/or different first and second capsule heights. Such first and second portions of the second part delimit:

in their first relative position, the cavity and the extraction chamber with first dimensions for receiving and extracting the first capsule; and in their second relative position, the cavity and the extraction chamber with second dimensions for receiving and extracting the second capsule such as second dimensions that are smaller than these first dimensions.

Optionally, the chamber in the first relative position is dimensionally unfit to hold the second capsule for extracting it and/or the chamber in the second relative position is dimensionally unfit to hold the first capsule for extracting it.

The invention also relates to a combination of a machine as described above and a capsule, such as a capsule selected from a set of a first capsule having first dimensions and a second capsule having second dimensions different to these first dimensions and which can both be handled and extracted in the extraction chamber.

A further aspect of the invention concerns a method of handling, in a machine as described above, a capsule, such as a capsule selected from a set of a first capsule having first dimensions and a second capsule having second dimensions different to the first dimensions and which can both be handled and extracted in the extraction chamber. The method comprises:

immobilizing the capsule between the first and second parts when the second part is in its transfer position;

moving by the actuator the second part to the extraction position, whereby when needed a relative movement of the first and second portions of the second part between their first and second relative positions can be driven by the actuator; and extracting the capsule in the thereby formed extraction chamber;

and optionally:

moving by the actuator the second part to the transfer position, whereby when needed a relative movement of the first and second portions of the second part (20) can be driven by the actuator; and removing the extracted capsule.

Generally speaking, the second part of the handling device can be moved from the extraction position to the transfer position (the first and second portions of the second part being be moved back into their relative position when the second part is in the transfer position, before or after or while the second part is moved to the transfer position) by generally reversing the movement. Possible deviations during the reversing movement may result from the (optional) use of the abovementioned retainer and counter-retainer arrangements and similar arrangements.

Another aspect of the invention relates to a use of a capsule for:

a machine as described above;

implementing the above described combination comprising such capsule and such machine; or carrying out the above described method for handling such capsule.

BRIEF DESCRIPTION OF THE DRAWINGS

The invention will now be described with reference to the schematic drawings, wherein:

FIGS. 2a to 5a and 2b to 5b illustrate a closing sequence of this device handling a large capsule and a small capsule, respectively;

DETAILED DESCRIPTION

Figure 15:
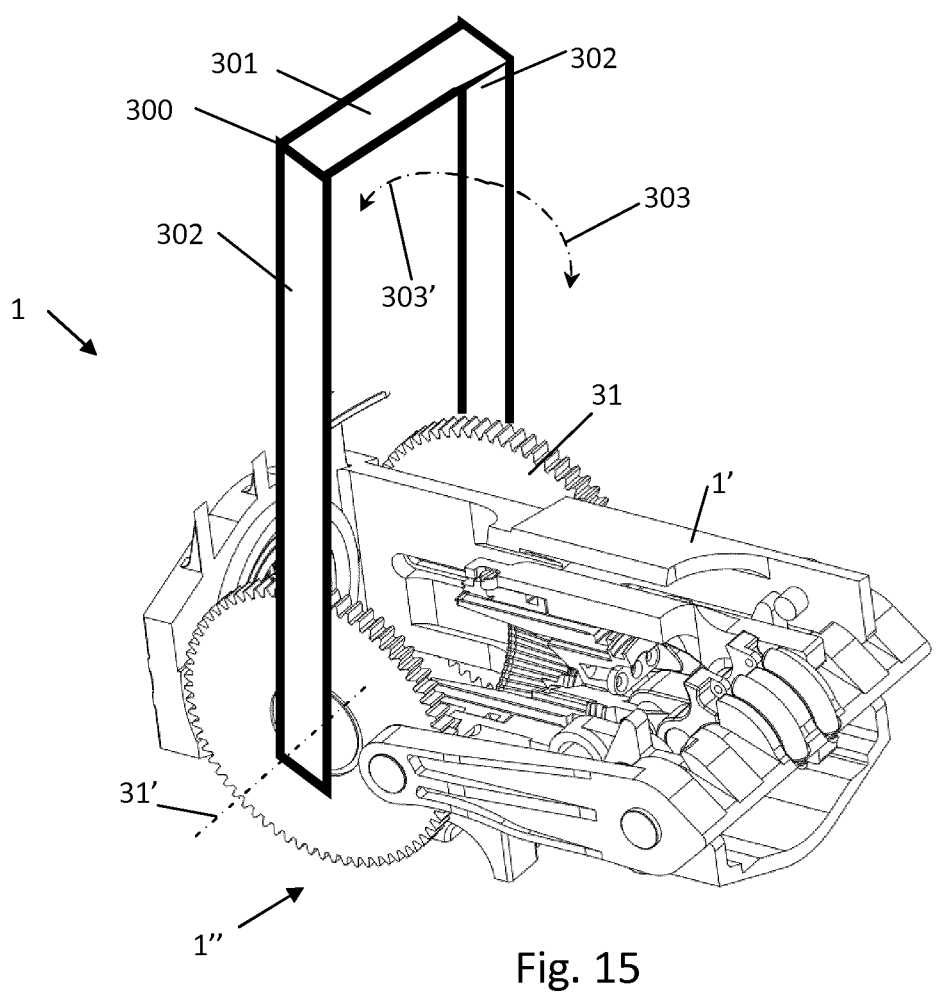
FIG. 15 illustrates an alternative implementation of the above machine in which the handling device is provided with a handle.
Figure 16:
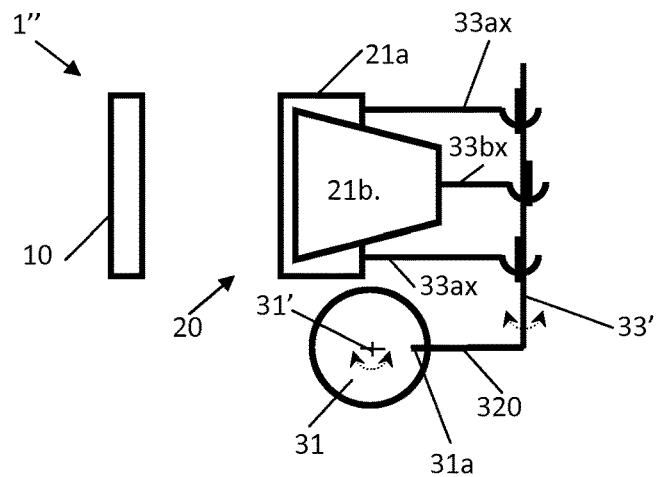
FIGS. 16, 16a and 16b illustrate schematically a further alternative implementation in which the handling device is provided with a camshaft.
Figure 16A:
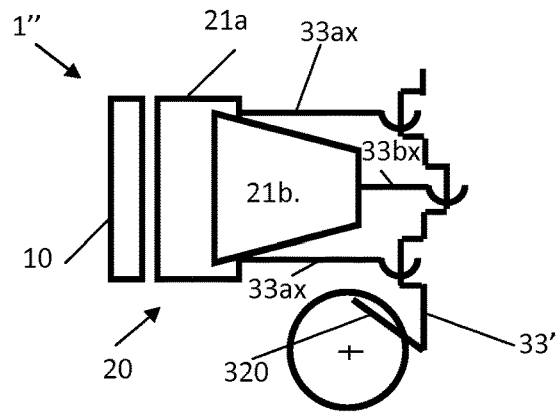
Figure 16B:
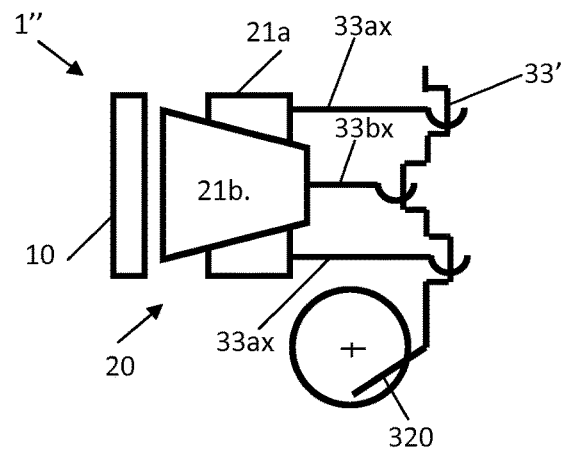

An exemplary machine 1 with a capsule handling device 1" according to the invention is generally shown in FIGS. 1 to 6b. FIGS. 7 to 14b, in which the same numeric references designate generally the same or similar elements, illustrate a second exemplary machine 1 with a capsule handling device 1" according to the invention. A variation of the actuation is illustrated in FIG. 15, in which the in which the same numeric references designate generally the same or similar elements. In the particular examples, the first two embodiments are shown with a handling device 1" actuated by a motor 30. This motor can however be substituted by a user handle 300 as shown in FIG. 15. FIGS. 16 to 16b, in which the same numeric references designate generally the same or similar elements, illustrate schematically how the previous embodiments can be modified by using a camshaft 33' instead of or in addition to a knuckle-arrangement in the mechanical transmission between the actuator 30,300 and the second movable part 20 of handling device 1'.

In particular, machine 1 comprises a frame 1' and a capsule handling device 1" mounted in and/or on the frame 1'.

Figure 1:
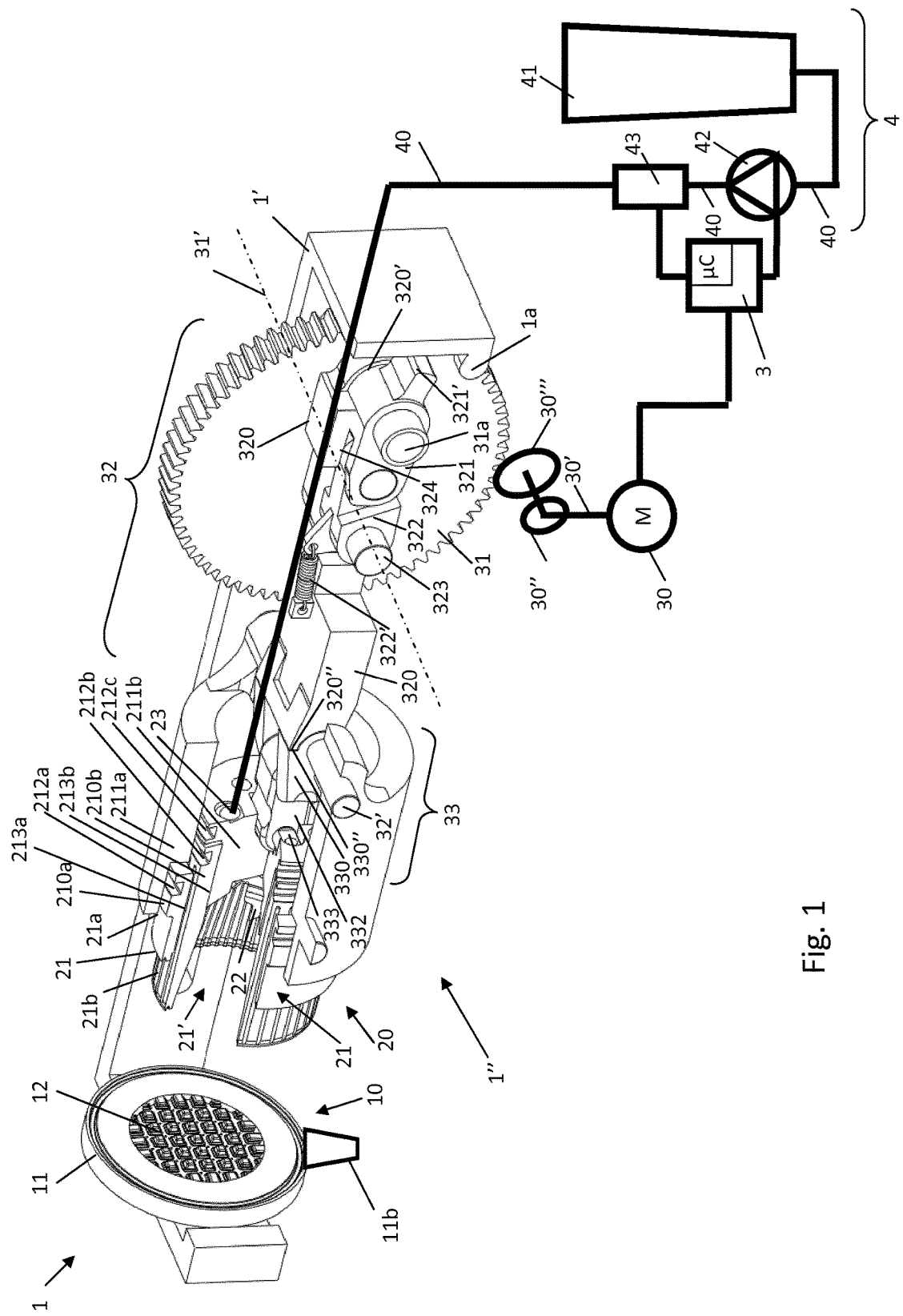
FIG. 1 illustrates part of a first embodiment of a machine according to the invention with a perspective view of the machine's capsule handling device that is partly cutaway.
Figure 3A:
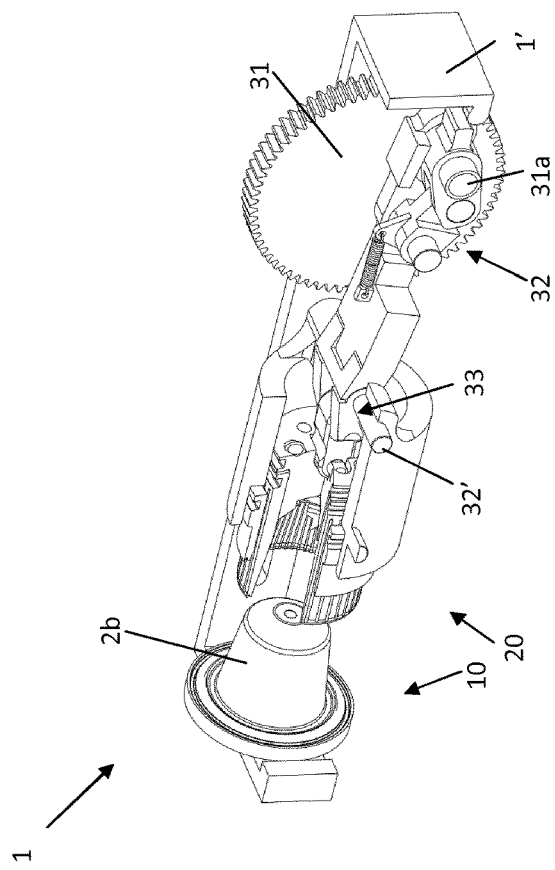
Figure 3B:
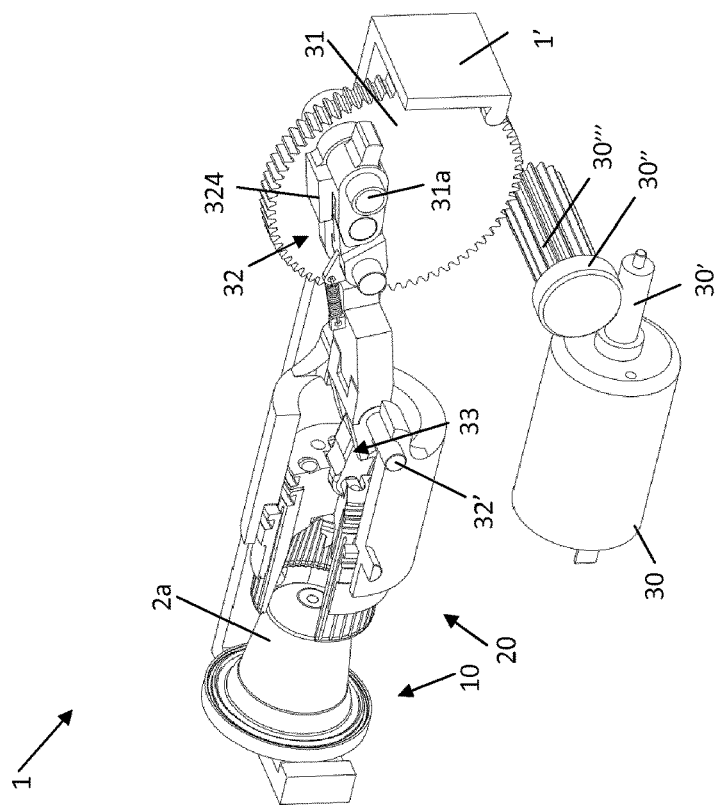
Figure 4A:
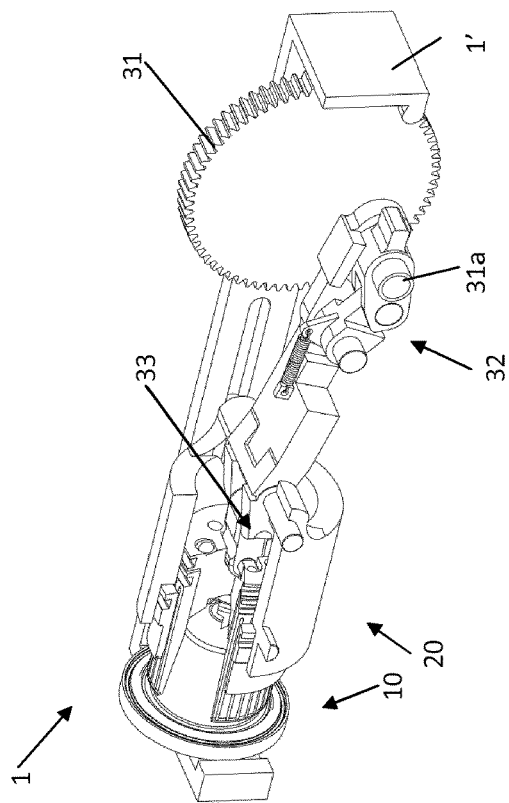
Figure 4B:
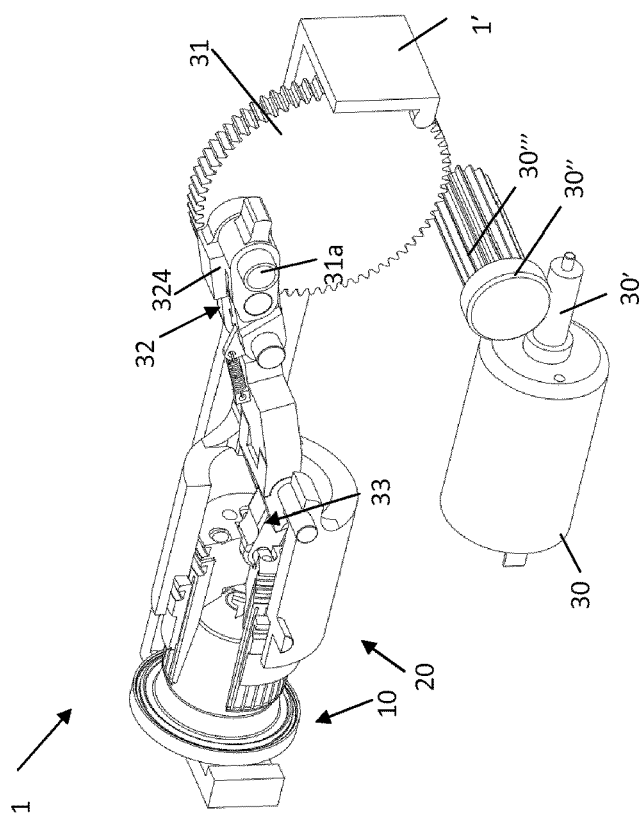

For example, frame 1' supports a control unit 3 and/or a machine's fluid circuit 4 as schematically illustrated in FIG. 1. Control unit 3 typically includes a controller or processor µC and/or a printed circuit board and/or and electric power management and/or a user-interface. The machine's fluid circuit 4 may include one or more fluid conduits 40, a water source, e.g. a tank 41 and/or connector to the city water distribution, a pump 42 and a thermal conditioner 43 such as a heater and/or a cooler. Control unit 3 is typically arranged to control the machine's fluid circuit 4 and can be connected to pump 42, thermal conditioner 43, a sensors such as a temperature sensor, flowmeter a pressure sensor, a level sensor (e.g. in a tank 41). When present, a motor 30 (FIGS. 9 and 10) is typically connected to control unit 3. Control unit 3 may also be connected to position or motion sensors associated with any movable part 20-21b,30-332b of machine 1, e.g. of the machine's capsule handling device 1".

Examples of fluid circuits are disclosed in WO 2009/074550 and in WO 2009/130099.

A suitable thermal conditioner 43 may include a heater and/or a cooler such as a heater that is a thermoblock or an on demand heater (ODH), for instance an ODH type disclosed in EP 1 253 844, EP 1 380 243 and EP 1 809 151.

Suitable control unit configurations and connections are for example disclosed in WO 2009/043851 and WO 2009/043865.

Handling device 1" can have an outlet 11b for dispensing an extract of a capsule 2a,2b handled by device 1".

Outlet 11b may be arranged for dispensing beverage to a user, e.g. to an area for placing a user-cup or a user-mug. The dispensing area may be delimited at the bottom by a support surface for holding a user cup or mug. Such support surfaces are well known in the art, e.g. as disclosed in EP 1 867 260 and WO 2009/074557.

Optionally, handling device 1" has a fluid inlet 23 connected to machine's fluid circuit 4,40,41,42,43 for circulating a fluid into such capsule 2a,2b, as schematically illustrated in FIG. 1.

Capsule handling device 1" comprises:
a first part 10 that is optionally fixed to frame 1' or movable thereto;
a second part 20 that is movable relatively to the frame 1' from a transfer position for inserting and/or removing capsule 2a,2b to an extraction position for extracting such capsule and vice versa, the second part 20 comprising:
  a capsule receptacle 21 delimiting a cavity 21' for receiving such capsule 2a,2b and for forming in the extraction position an extraction chamber 21" with first part 10; and
  a first portion 21a and a second portion 21b that are relatively movable between a first relative position and a second relative position to change at least one dimension 21da,21db,21ha,21hb of cavity 21' and of extraction chamber 21"; and
  optionally an inlet 23 for letting a fluid into chamber 21" to capsule 2a,2b in chamber 21" e.g. via or along an opening device such as along one or more piercing elements 22 in cavity 21';
and
an actuator 30,300, such as a motor 30 or a handle 300, connected to second part 20 for driving movable second part 20 between the transfer position and the extraction position, for instance an actuator 30,300 that is fixed in or to frame 1'.

The first part may be fixed to the frame or movable thereto. When the first part is movable relative to the frame (not shown), the first part can (also) be driven by the same actuator 30,300, e.g. via a cam-arrangement, in line with the teaching disclosed in concurrently filed application EP 2014163793.

Examples of a actuators having a motor are disclosed in EP 1767129, WO 2012/025258, WO 2012/025259 and WO 2013/127476. Example of actuators having a user-handle are disclosed in WO 2005/004683, WO2007/135136 and WO 2009/043630.

Handling device 1" may include or delimit or be associated with a capsule feed channel, e.g. a chimney, for guiding capsule 2a,2b, e.g. guiding capsule 2a,2b by gravity, to inbetween first and second parts 10,20 in the transfer position and immobilize capsule 2a,2b therebetween to then form extraction chamber 21" for extracting capsule 2a,2b.

Examples of such capsule feed and immobilization channels are disclosed in EP2013196041 and EP2013196042.

Extraction chamber 21" may be configured for holding and housing capsule 2a,2b that contains a flavouring ingredient, such as tea or coffee or chocolate or powder milk and/or any other content mentioned above.

A flavoured beverage may be prepared by circulating a carrier liquid, such as water, into extraction chamber 21" to flavour the liquid by exposure to a flavouring ingredient contained in capsule 2a,2b held in extraction chamber 21".

When capsule 2a,2b is located in extraction chamber 21", an axis of symmetry of capsule 2a,2b may generally be aligned with a corresponding axis of symmetry of extraction chamber 21". To accommodate capsules of different sizes, chamber 21 may have variable dimensions fitting about the capsules and/or closure distances, as for example taught in PCT/EP13/070756 and PCT/EP13/070866.

Upon extraction, capsule 2a,2b may be removed from device 1" by using a suitable capsule remover, e.g. as disclosed in EP2013196040.

Optionally, first part 10 has a support 11 with an outlet 11b for letting out an extract of capsule 2a,2b e.g. via or along an opening device such as via an opening plate 12 e.g. fixed to or integral with support 11.

Optionally, second part 20 has an inlet 23 for letting a fluid into the chamber 21" to capsule 2a,2b e.g. via or along an opening device such as along one or more piercing elements 22 in cavity 21'.

Opening devices are optional or not needed when machine 1 is destined to be used for capsules with pre-opened corresponding capsule walls or faces.

When closed capsules 2a,2b are used, first and second parts 10,20 may include a capsule opener such as piercing elements, e.g. blades, and/or a tearing tool, e.g. an opening plate 12, for example with a tearing profile, for instance as known from Nespresso™ machines. See for example EP 0 512 468, EP 0 512 470, PCT/EP2013/073530, EP2013180164.9 and EP2013180166.4 and EP2013180165.6.

Figure 6:
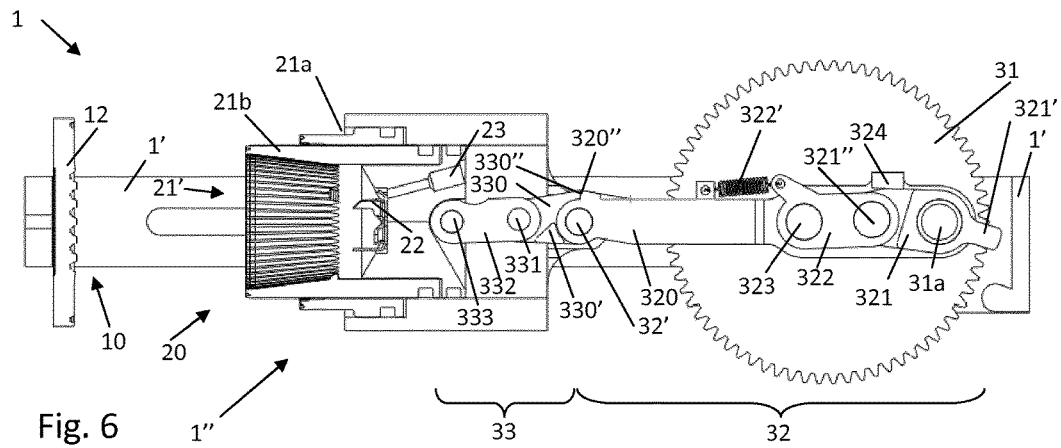
FIG. 6 is a vertical cross-sectional view of this handling device when open, FIGS. 6a and 6b illustrating the closed device in a configuration for handling a large capsule and a small capsule, respectively.
Figure 6A:
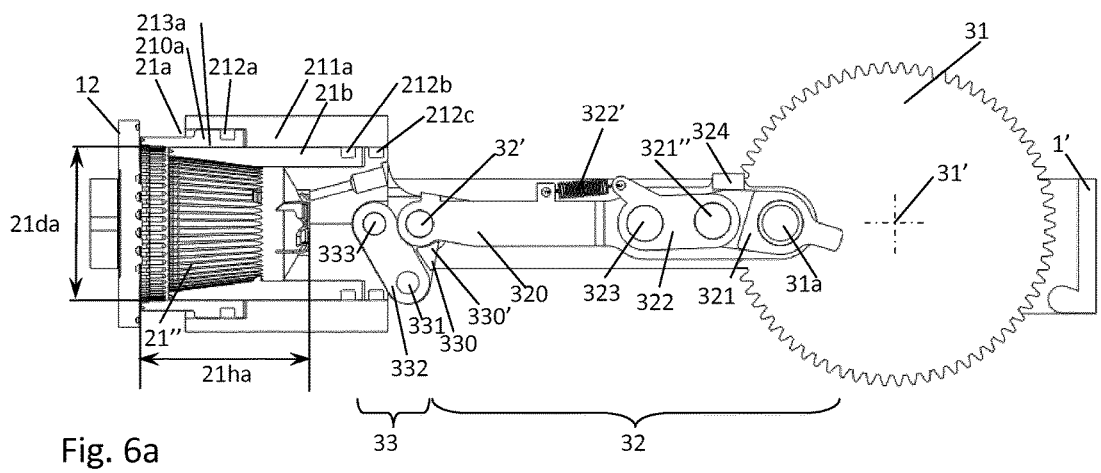
Figure 6B:
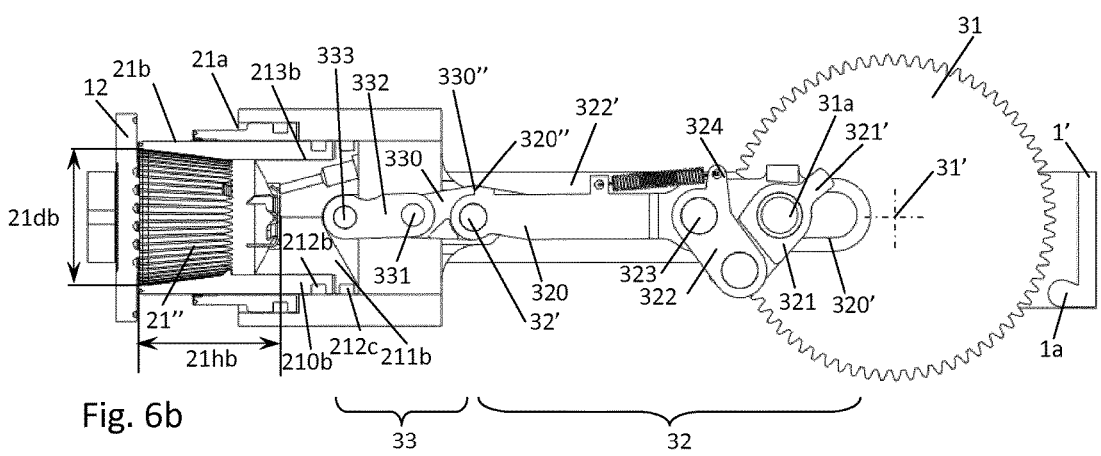
Figure 7:
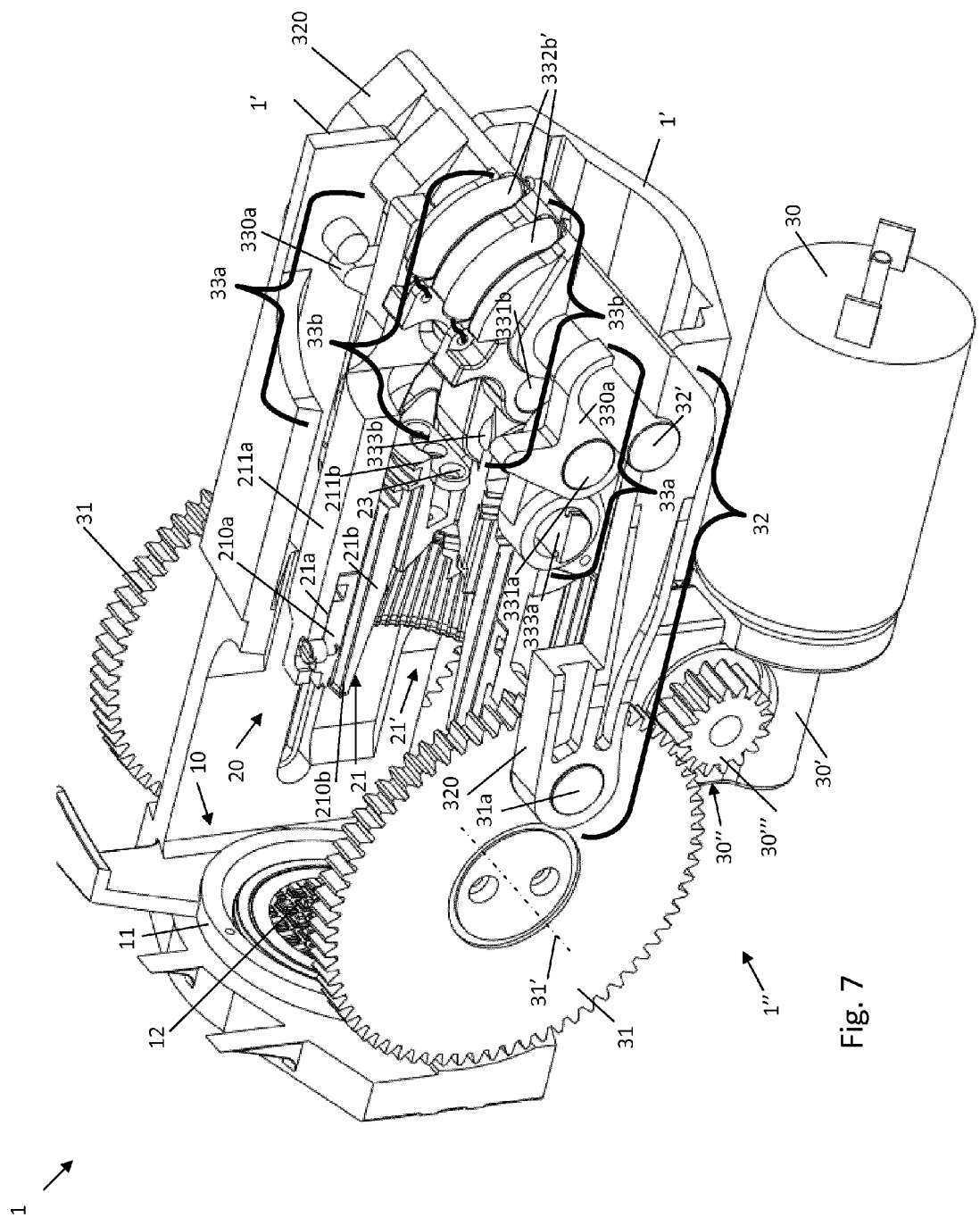
FIG. 7 illustrates part of a second embodiment of a machine according to the invention with a perspective view of the machine's capsule handling device that is partly cutaway.
Figure 8B:
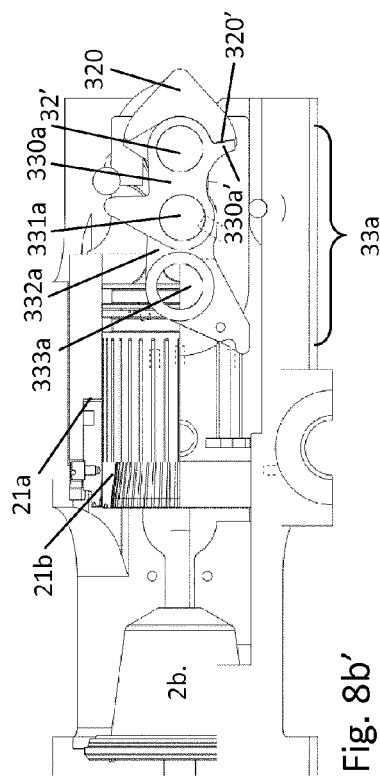
FIGS. 8a-8a' to 11a-11a' and 8b-8b' to 11b-11b' illustrate a closing sequence of this device handling a large capsule and a small capsule, respectively.
Figure 8B:
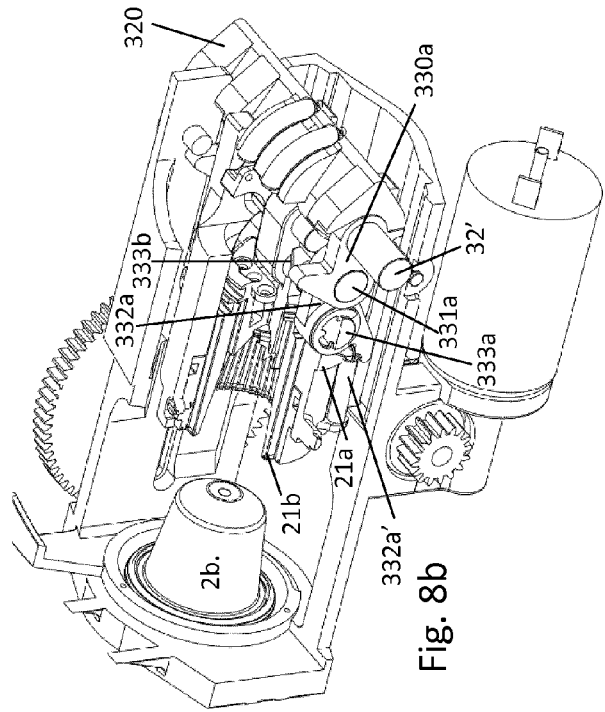
Figure 8A:
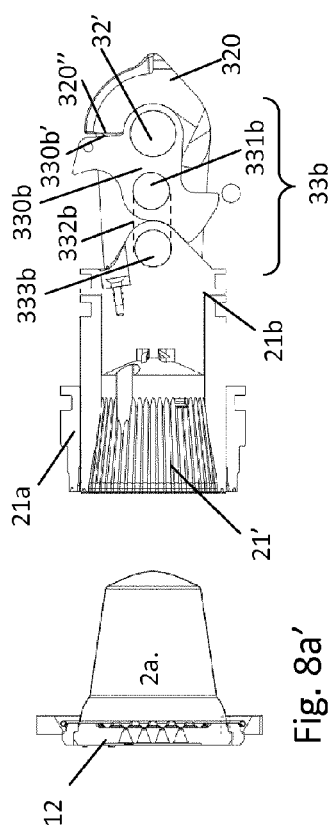
Figure 8A:
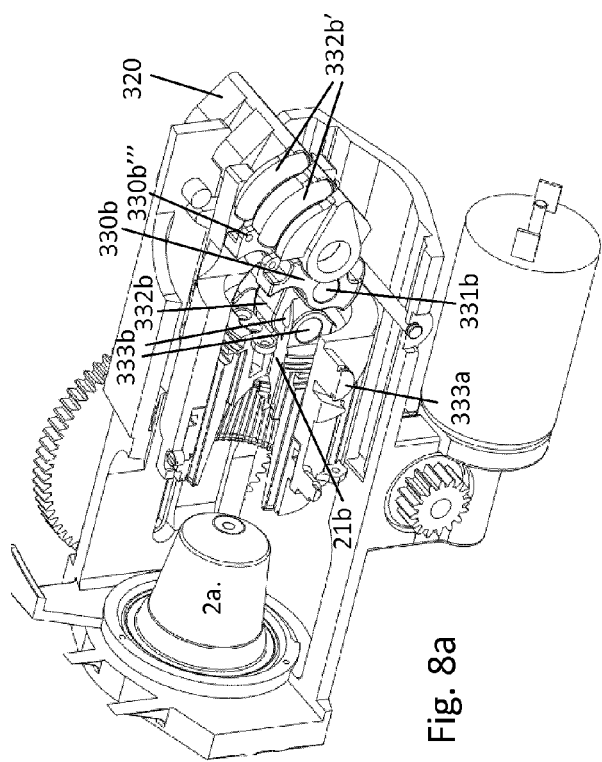

Optionally, at least one of first and second portions 21a,21b comprises a base 211a,211b and a dimensional adjuster 210a,210b movably mounted to base 211a,211b, such as an anti-backlash arrangement for urging first and second parts 10,20 together and/or against capsule 2a,2b, e.g. for sealing, as for example illustrated in FIGS. 6 to 7. For instance, dimensional adjuster 210a,210b is actuated hydraulically e.g. via a hydraulic circuit that comprises a fluid passage 213a,213b and/or one or more sealing elements 212a,212b,212c. Such hydraulic circuit 213a,213b, 212a,212b,212c can be connected to the machine's fluid circuit 4 e.g. to fluid inlet 23 of device 1". Fluid passage 213a,213b may be connected to cavity 21' and/or extraction chamber 21". Examples of such dimensional adjusters are disclosed in WO 2008/037642.

Handling device 1" may be arranged for handling selectively different types and/or sizes 2da,2db,2ha,2h of capsules 2a,2b. Capsules 2a,2b may differ as to the volume of their content and/or the conditions for extracting the content, e.g. temperature, pressure and/or flow caracteristics.

A manual or an automatic capsule recognition or sensing system may be used to parameterize and adjust the handling of capsule 2a,2b, e.g. to adjust chamber 21", automatically in line with the recognized or sensed capsule type or size, and/or the conditions of extracting capsule 2a,2b, e.g. temperature and/or volume and/or pressure extraction conditions. Suitable automatic capsule sensing and recognition systems are for example disclosed in WO 2012/123440 and PCT/EP13/070167.

Capsule 2a,2b may be fed to handling device 1" from a capsule loader, e.g. an automatic capsule loader such as a capsule loader that is driven by actuator 30,300. Suitable capsule loaders are for example disclosed in PCT/EP13/ 064001, PCT/EP13/064003 and EP 2013196594.

Device 1" can be arranged for handling selectively a first capsule 2a having a first flange 2a' and a second capsule 2b having a second flange 2b' smaller than first flange 2a'. For instance, second flange 2b' has a dimension, e.g. diameter 2db, that is smaller than a dimension, e.g. diameter 2da, of first flange 2a'. Optionally, second capsule 2b has a height 2hb that is smaller than a height 2ha of first capsule 2a.

Capsule 2a,2b can be of the type described above under the header "field of the invention". Capsule 2a,2b may have a capsule bottom 2a",2b", e.g. an flow-through face such as an inflow-face, from which extends a sidewall to flange 2a',2b' to form a container-body or receptacle, e.g. a generally cup-shaped body, for holding the capsule content, such as a beverage ingredient. Capsule 2a,2b may have an axis of symmetry, for example an axis of revolution generally concentric with flange 2a',2b'. Capsule 2a,2b may have a face extending across flange 2a',2b', e.g. forming a flow-through face such as an extraction face. Liquid may circulated via these faces through capsule 2a,2b, e.g. a carrier liquid such as water, to be mixed with the content of capsule 2a,2b.

Flange 2a',2b' of capsule 2a,2b may serve for:
guiding capsule 2a,2b to inbetween parts 10,20, e.g. via corresponding guide portions of machine 1;
removing capsule 2a,2b from parts 10,20 after extraction; and/or
to seal a mouth 21'" of part 20, such as a mouth 21a",21b" of portion 21a,21b, against part 10, e.g. plate 12, when part 10 is in its extraction position against part 20.

In an alternative embodiment, the capsule may be devoid of such a flange. In such a case and if needed, the capsule may be guided via its flangeless body, the capsule may be removed by an ejector pusher movable into cavity 21' or from plate 12, and part 20 in its extraction position may be sealed together with part 10 by direct contact thereof. It will be evident to the skilled person that such features may also be implemented for handling a capsule with a flange.

The storage space of capsule 2b may be smaller than the storage space of capsule 2a. For instance, first capsule 2a may for instance have a shoulder portion adjacent flange 2a' that provides additional storage space for the content, e.g. ingredient.

Suitable capsules are for example disclosed in EP 0 512 468, EP 0 512 470 and EP 2 068 684.

Actuator 30,300 is further connected to first and/or second portions 21a,21b of second part 20 to relatively move first and second portions 21a,21b between their first and second relative positions. Optionally actuator 30,300 drives second part 20 between its transfer and extraction positions and drives first and second portions 21a,21b of second part 20 between their first and second positions: simultaneously; or sequentially; or partly simultaneously and partly sequentially.

Hence, a single actuator may actuate part 20 between the transfer and the extraction position as well as portions 21a,21b of part 20 between their first and second relative positions.

Device 1" may comprise a mechanical transmission 32,33,33a,33b, connecting actuator 30,300 to second part and to first and second portions 21a,21b of second part 20 for driving:
- second part 20 between the transfer position and the extraction position; and
- first and/or second portions 21a,21b of second part 20 to relatively move first and second portions 21a,21b between their first and second relative positions.

Mechanical transmission 32,33,33a,33b may be connected to actuator 30,300 by an actuator transmission 30', 30",30''',302,31'. For instance, when the actuator is a motor 30, the actuator transmission may include at least one of: axles 31', pinions e.g. toothed pinions 30",30''', wheels e.g. toothed wheels, racks e.g. toothed racks, worm drives 30', knuckle joint arrangements, cam arrangements and belts. When the actuator is a handle 300 with a grip 301, the transmission may include at least one of levers 302, axles 31', pinions e.g. toothed pinions, wheels e.g. toothed wheels, racks e.g. toothed racks, worm drives, knuckle joint arrangements, cam arrangements and belts.

Mechanical transmission 32,33,33a,33b may include:
- a primary mechanical transmission 32,320,32' for driving second part 20 between the transfer position and the extraction position; and
- a secondary mechanical transmission 33,330,330',332, 333; 33a,330a,331a,332a,333a; 33b,330b,331b,332b, 333b for driving first and/or second portions 21a,21b of second part 20 to relatively move first and second portions 21a,21b between their first and second relative positions.

The secondary mechanical transmission may be driven by the primary mechanical transmission, the secondary mechanical transmission is for instance serially mounted on the primary mechanical transmission.

As illustrated in the first embodiment (FIGS. 1 to 6) primary mechanical transmission 32,320,32' may include a closure distance shifter 321,322,323 for adjusting a travelling distance of second part 20 between the transfer position and the extraction position depending on the relative position of first and second portions 21a,21b when second part 20 is in the extraction position.

Closure distance shifter 321,322,323 can connect primary mechanical transmission 32,320,32' to a drive wheel 31, such as a drive wheel actuated by actuator 30,300 e.g. via an actuator transmission 30',30",30''',302,31'. For instance, shifter 321,322,323 is connected via a pivot connector 31a to drive wheel 31 and/or via a pivot connector 323 to a transmission rod 320 of primary mechanical transmission 32,320,32'.

Closure distance shifter 321,322,323 may interact with a slide 320' of a transmission rod 320 of primary mechanical transmission 32,320,32'.

Closure distance shifter 321,322,323 can be associated with at least one of:
- a return spring 322', such as a return-spring mounted to a transmission rod 320 of primary mechanical transmission 32,320,32'; and
- a direction discriminator 324, such as a discriminator fixed to a transmission rod 320 of primary mechanical transmission 32,320,32', to block and unblock the closure distance shifter depending on the relative position of the first portion 21a and a second portion 21b when second part 20 is in the extraction position.

For instance, primary mechanical transmission 32,320,32' is connected to first portion 21a of second part 20 and closure distance shifter 321,322,323 is arranged to:
- extend primary mechanical transmission 32,320,32' and thus first portion 21a when a large capsule 21a is used (for instance by maintaining shifter 321,322,323 in an extended configuration as illustrated in FIGS. 2a to 5a); and/or
- retract primary mechanical transmission 32,320,32' and thus first portion 21a (so that second portion 21b telescopes beyond first portion 21a) when a small capsule 21b is used (for instance by allowing shifter 321,322,323 to retract as illustrated in FIGS. 2b to 5b).

Alternatively (not shown), the primary mechanical transmission can be connected to the second portion of second part and the closure distance shifter can thus be arranged to: extend the primary mechanical transmission and thus the second portion when a small capsule is used (for instance by maintaining the shifter in an extended configuration); and/or retract the primary mechanical transmission and thus the second portion (so that the first portion telescopes beyond the second portion) when a large capsule is used (for instance by allowing shifter to retract).

Closure distance shifter 321,322,323 may include a knuckle-joint arrangement 321,322,323. Alternative arrangements may include wheels e.g. toothed wheels, racks e.g. toothed racks, worm drives, cam arrangements and belts.

As illustrated in the second embodiment (FIGS. 7 to 14) Primary mechanical transmission 32,320,32' can have a dimensionally constant drive structure 320 to maintain a constant travelling distance of second part 20 between the transfer position and the extraction position irrespectively of the relative position of first and second portions 21a,21b when second part 20 is in the extraction position. The closure distance of second part 20 may be adjusted via secondary mechanical transmission 33a,33b.

As illustrated in FIGS. 1, 7 and 15, primary transmission 32,320,32' can be connected to a drive wheel 31, such as a drive wheel actuated by actuator 30,300 e.g. via an actuator transmission 30',30",30''',302,31'. For instance, primary transmission 32,320,32' is connected via a pivot connector 31a to drive wheel 31.

Primary transmission 32,320,32' may comprise a connecting rod 320 or wheel, such as a pair of connecting rods 320 or wheels, e.g. a rod 320 or wheel connecting a drive axle 32' to which second portion 20 is directly or indirectly, e.g. via secondary mechanical transmission 33a,33b, connected to be driven thereby.

Primary transmission 32,320,32' can have a mechanical input that is driven in rotation about a drive arc 31 and a mechanical output that is moved in translation.

Secondary mechanical transmission 33 may comprise a relative position shifter 330,331,332 for relatively moving first and second portions 21a,21b.

Relative position shifter 33,330,331,332 can connect primary mechanical transmission 32, e.g. an output 32' of primary mechanical transmission 32, to first and second portions 21a,21b such as via pivoting axis 32',333 mounted to first and second portions 21a,21b.

Relative position shifter 33,330,331,332 may be associated with a first travel stop 330' for stopping a travel of first and second portions 21a,21b when they reach their first relative position and/or a second travel stop 330" for stopping a travel of the first and second portions 21a,21b when they reach their second relative position.

Relative position shifter 330,331,332; 331a,331a,332a; 331b,331b,332b can be associated with a direction discriminator 320',320",330", such as a travel stop arrangement 320',320",330" formed on a transmission rod 320 of primary mechanical transmission 32 and on a transmission rod 330 of secondary mechanical transmission 33, to block and unblock or drive or not drive the relative position shifter depending on the required relative position of first portion 21*a* and a second portion 21*b* when second part 20 is in the extraction position.

Direction discriminator 324,320',320",330", may allow the corresponding shifter 321,321",322; 330,331,332; 330*a*, 331*a*,332*a*; 330*b*,331*b*,332*b* to be blocked or unblocked or driven or not drive.

For instance, direction discriminator 324 is arranged to block in extended position shifter 321,321",322 when primary mechanical transmission 32 is driven counter-clockwise to move part 20 from the transfer position to the extraction position (FIGS. 2*a* to 5*a*); direction discriminator 324 can be arranged to allow the retraction of shifter 321,321",322 when primary mechanical transmission 32 is driven clockwise to move part 20 from the transfer position to the extraction position (FIGS. 2*b* to 5*b*).

Direction discriminator 320" may be arranged to block in extended position shifter 330,331,332 when primary mechanical transmission 32 is driven clockwise to move part 20 from the transfer position to the extraction position (FIGS. 2*b* to 5*b* and 6*b*); direction discriminator 320'',330" can be arranged to allow the retraction of shifter 321,321", 322 when primary mechanical transmission 32 is driven counter-clockwise to move part 20 from the transfer position to the extraction position (FIGS. 2*a* to 5*a* and 6*a*).

Relative position shifter 33,330,331,332 may comprise a knuckle-joint arrangement 330,331,332 driving first and second portions 21*a*,21*b* between their first and second relative positions.

As illustrated in FIGS. 7 to 14*b*, secondary mechanical transmission 33*a*,33*b* may comprise a first relative position shifter 330*a*,331*a*,332*a* connected to and driving first portion 21*a* and second relative position shifter 330*b*,331*b*,332*b* connected to and driving second portion 21*b*. First and second relative position shifters 330*a*,331*a*,332*a*;330*b*, 331*b*,332*b* can be arranged to relatively move first and second portions 21*a*,21*b*.

One or both relative position shifters 330*a*,331*a*,332*a*; 330*b*,331*b*,332*b* can be connected primary mechanical transmission 32, e.g. to an output 32' of primary mechanical transmission 32.

One or both relative position shifters 330*a*,331*a*,332*a*; 330*b*,331*b*,332*b* can be associated with a first end of A travel stop 2*a* for stopping a travel of the first and/or second portions 21*b* when they reach their first relative position and/or a second travel stop 1*a*1',333*a*' for stopping a travel of first and/or second portions 21*a* when they reach their second relative position.

One or both relative position shifters 330*a*,331*a*,332*a*; 330*b*,331*b*,332*b* may be associated with a direction discriminator 320',330*a*'; 320",330*b*', such as a travel stop arrangement 320',330*a*'; 320",330*b*' formed on a transmission rod 320 of primary mechanical transmission 32 and on a transmission rod 330*a*,330*b* of secondary mechanical transmission 33, to selectively drive or not drive the relative position shifter 33*a*,33*b* depending on the required relative position of first and second portions 21*a*,21*b* when second part 20 is in the extraction position.

Figure 9B:
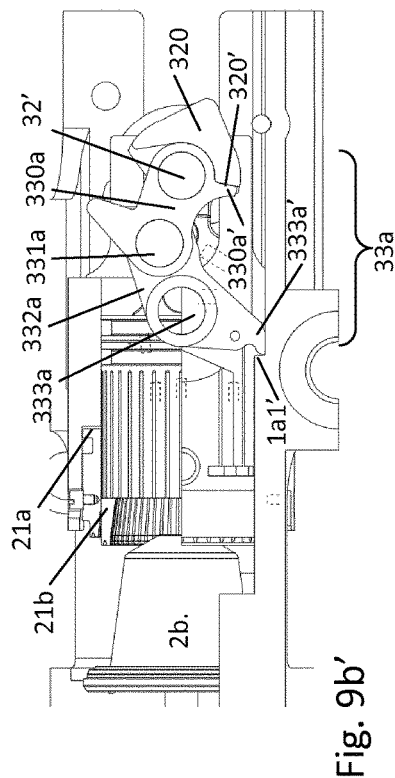
Figure 9B:
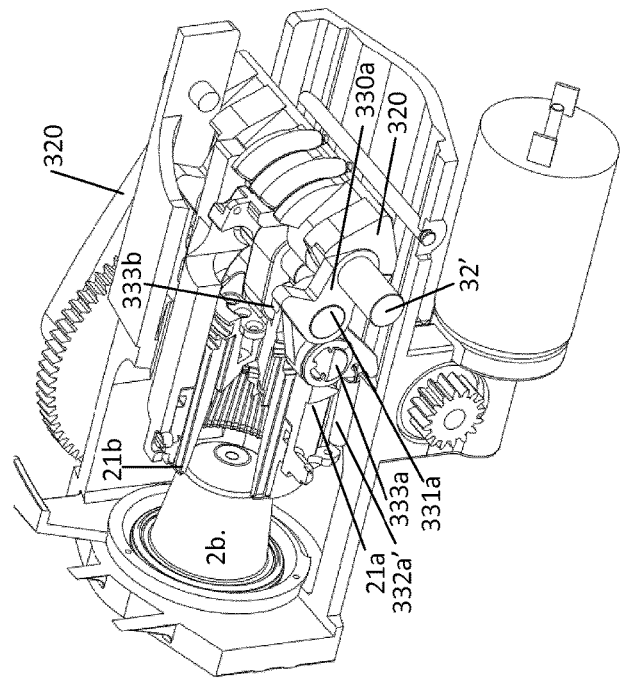
Figure 9A:
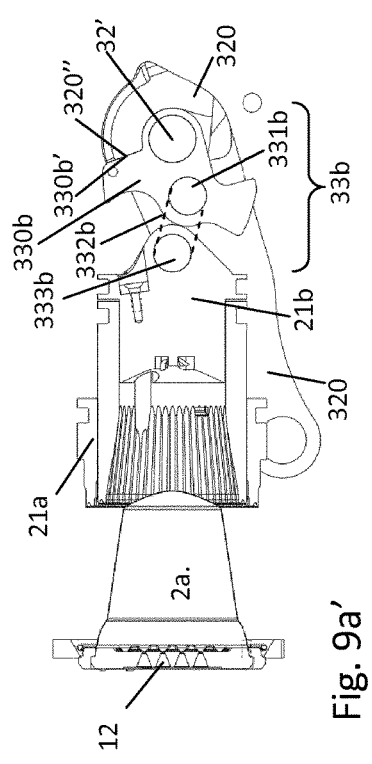
Figure 9A:
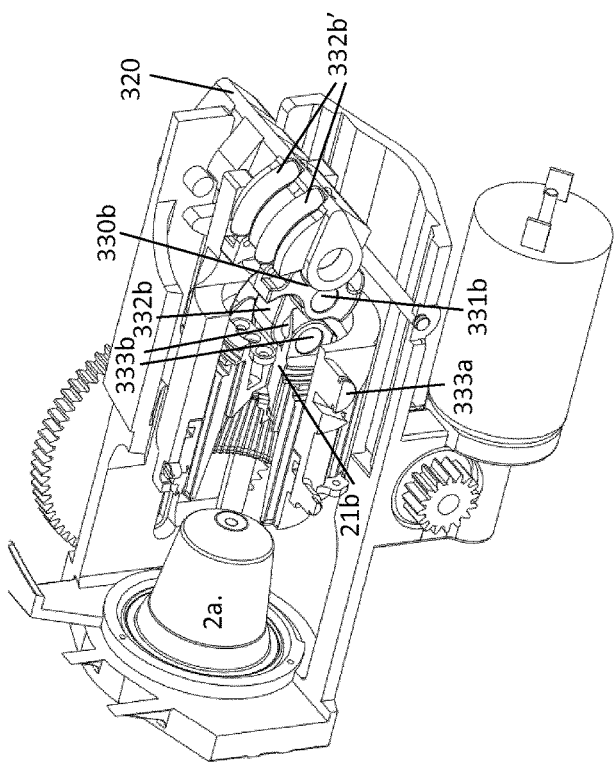
Figure 10B:
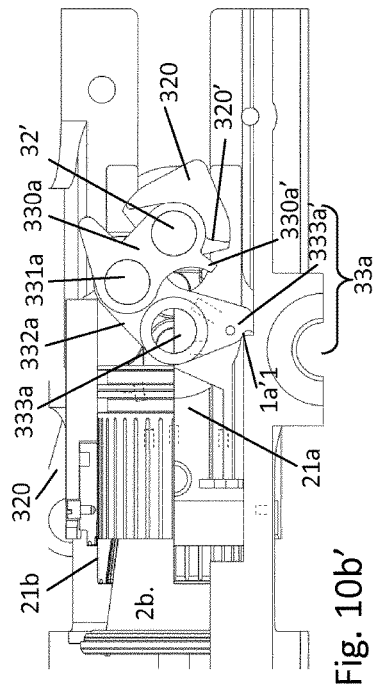
Figure 10B:
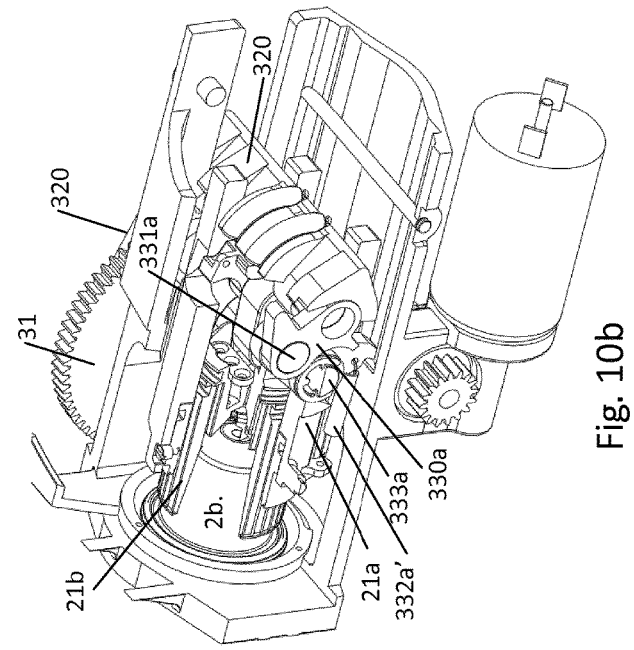
Figure 10A:
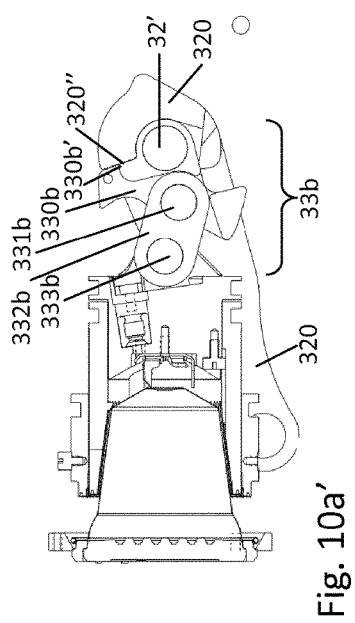
Figure 10A:
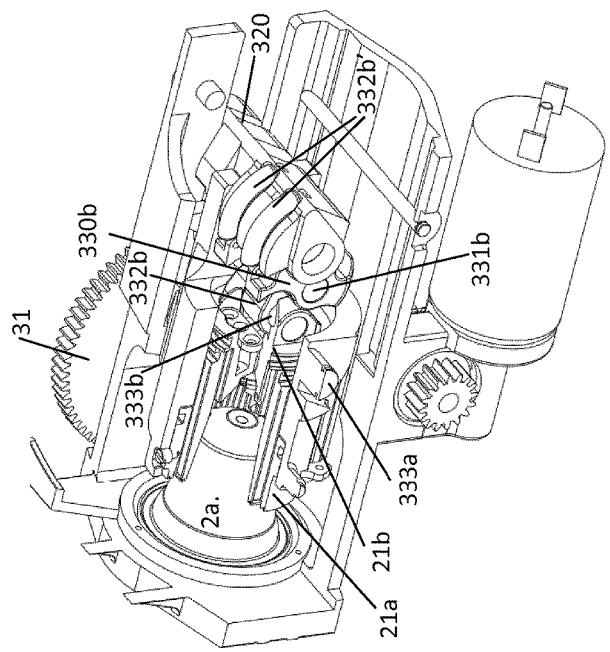
Figure 11B:
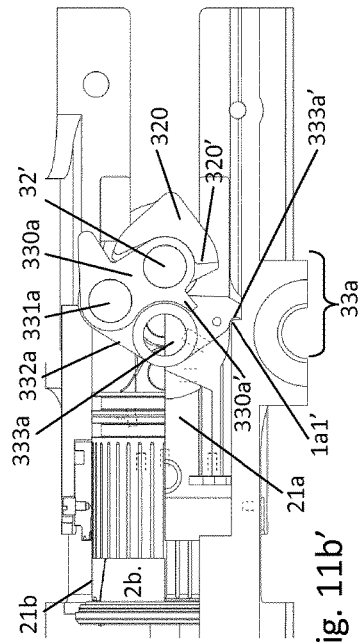
Figure 11B:
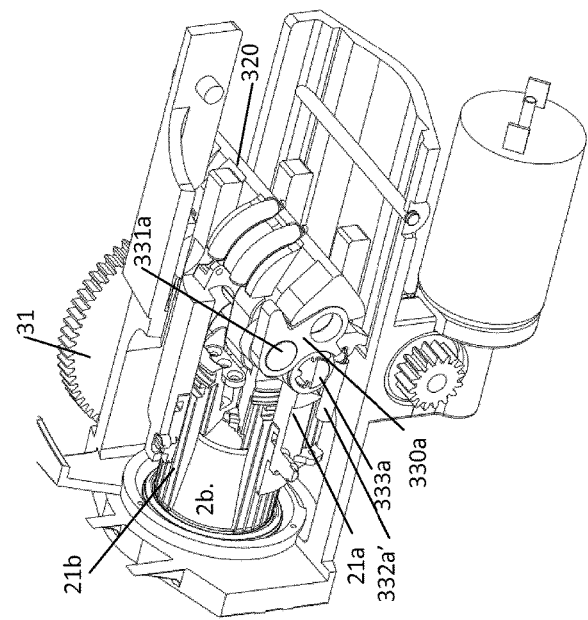
Figure 11A:
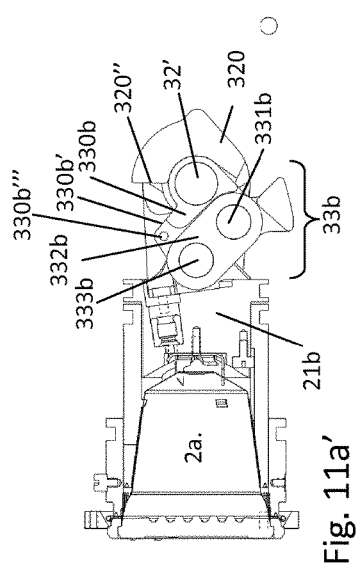
Figure 11A:
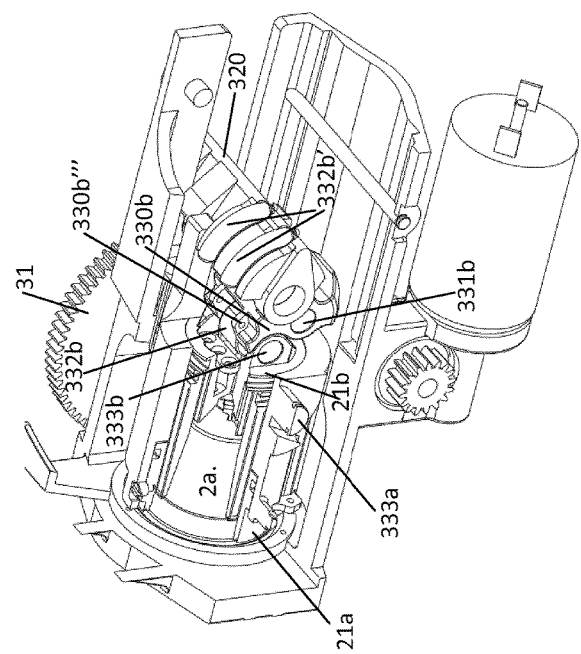

Direction discriminator 320" may be arranged to allow (and drive) shifter 330*b*,331*b*,332*b* into a retracted configuration when primary mechanical transmission 32,32' is driven counter-clockwise to move part 20 out of the transfer position (FIGS. 8*a*' to 10*a*') and to leave shifter 330*b*,331*b*, 332*b* in extended position, for instance under bias of spring 332*b*' (which is illustrated in a compressed state to show the movement of member 320*b* with its retainer 320*b*''' for spring 332*b*') e.g. lodged in recesses 332*b*", when primary mechanical transmission 32,32' is drive clockwise to move part 20 out of the transfer position (FIGS. 8*a* to 10*a*). As illustrated in FIGS. 10*a*' and 11*a*', the end of movement of the retraction of shifter 330*b*,331*b*,332*b* is not caused by discriminator 320" (which turns into the opposite direction towards the extraction position) but by the resistance of capsule 2*a* against portion 21*b* to which shifter 330*b*,331*b*, 332*b* is connected.

Direction discriminator 320' may be arranged to allow (and drive) shifter 330*a*,331*a*,332*a* into a retracted configuration when primary mechanical transmission 32,32' is driven clockwise to move part 20 out of the transfer position (FIGS. 8*b*' to 10*b*') and to leave shifter 330*a*,331*a*,332*a* in extended position (for instance under bias of spring 332*a*') when primary mechanical transmission 32,32' is drive counter-clockwise to move part 20 out of the transfer position (FIGS. 8*b* to 10*b*). As illustrated in FIGS. 10*b*' and 11*b*', the end of movement of the retraction of shifter 330*a*,331*a*,332*a* is not caused by discriminator 320' (which turns into the opposite direction towards the extraction position) but by the retainer arrangement 1*a*1',333*a*'.

One or both relative position shifters 330*a*,331*a*,332*a*; 330*b*,331*b*,332*b* may include a knuckle-joint arrangement 330*a*,331*a*,332*a*;330*b*,331*b*,332*b* driving first and/or second portions 21*a*,21*b* between their first and second relative positions.

In a variation schematically illustrated in FIGS. 16 to 16*b*, one or both relative position shifters 33',33*ax*,33*bx* may include a camshaft 33', such as a single cam shaft 33' comprised in both relative position shifters, that drive(s) directly or indirectly to first and/or the second portions 21*a*,21*b* into their first relative position or their second relative position. Optionally first and second portions 21*a*, 21*b* are in an intermediate relative position (FIG. 16) when second part 20 is in the transfer position and being brought into their first or second relative position (FIGS. 16*a* and 16*b*), depending on the direction of pivoting of the cam shaft 33', when second part 20 is brought from the transfer position to the extraction position.

Each relative position shifter 330*a*,331*a*,332*a*; 330*b*, 331*b*,332*b* can be in a serial mechanical configuration between an output 32' of first mechanical transmission 32 and an input 333*a*,333*b* of portion 21*a*,21*b* associated with shifter 330*a*,331*a*,332*a*;330*b*,331*b*,332*b*.

First relative position shifter 330*a*,331*a*,332*a* may be mounted in parallel to second relative position shifter 330*b*, 331*b*,332*b* on first mechanical transmission 32. For instance, first and second position shifters 330*a*,331*a*, 332*a*;330*b*, 331*b*,332*b* are mounted in parallel between first mechanical transmission 32 and second part 20.

Actuator 30,300 can have a drive output 30',31', such as a rotor 30' or an axle 31', that operates selectively in a first direction and in a second direction different to the first direction. For instance, rotor 30' or axle 31' rotates selectively in a clockwise direction 303 and in a counter-clockwise direction 303'. Actuator 30,300 can be controlled to operate drive output 30',31' in first direction or in second direction via a user-interface 3,301 or via a sensor 3 arranged to sense a characteristic of a capsule 2*a*,2*b* to be handled by device 1", such as a size and/or a type of such capsule 2*a*,2*b*.

Second part 20 can be moved:
   from the transfer position to the extraction position by actuator 30,300 via primary mechanical transmission irrespectively of the first and second directions of operation of drive output 30',31' while first and second portions 21a,21b of second part 20 are, via secondary mechanical transmission 33,33a,33b, either:

relatively moved (FIG. 6a) to their first relative position or maintained in their first relative position or relatively moved to their second relative position or maintained (FIG. 6b) in their second relative position, depending on the direction of operation of the drive output 30',31';

and/or from the extraction position to the transfer position by actuator 30,300 while first and second portions 21a,21b of second part 20 are relatively moved to an intermediate relative position (FIGS. 8a and 8b) by actuator 30,300 either from their first relative position (FIGS. 11a and 16a) or from their second relative position (FIGS. 11b and 16b) irrespectively of the first and second directions of operation of drive output 30',31' or by reversing the direction operation of drive output 30',31' vis-à-vis the direction of operation for bringing first and second portions 21a,21b into their first or second relative position and second part 20 into its extraction position.

At least one of primary mechanical transmission 32 and secondary mechanical transmission 33, e.g. a first and/or a second mechanical transmission 33a,33b, may be either blocked (e.g. not retracted and not retractable) or unblocked (e.g. retracted or retractable) depending on the direction of operation of drive output 30',31' when second part 20 is moved from transfer position to the extraction position.

In the first embodiment, for instance, primary mechanical transmission 32 (e.g. shifter 330,331,332) is dimensionally blocked (e.g. not retracted and not retractable) when part 20 is moved into the extraction position with first and second portions 21a,21b in(to) the first relative position (FIGS. 2a to 5a); primary mechanical transmission 32 (e.g. shifter 330,331,332) is dimensionally adjusting (e.g. retracting) when part 20 is moved into the extraction position with first and second portions 21a,21b in(to) their second relative position (FIGS. 2b to 5b).

In the second embodiment, for instance, first secondary mechanical transmission (e.g. shifter 330a,331a,332a) is dimensionally blocked (e.g. not retracted and not retractable) and second secondary mechanical transmission 330b,331b,332b is dimensionally adjusting (e.g. retracting) when part 20 is moved into the extraction position with first and second portions 21a,21b in(to) the first relative position (FIGS. 8a to 11a); second secondary mechanical transmission (e.g. shifter 330b,331b,332b) is dimensionally blocked and second first mechanical transmission 330a,331a,332a is dimensionally adjusting (e.g. retracting) when part 20 is moved in(to) the extraction position with first and second portions 21a,21b in the first relative position (FIGS. 8a to 11a).

Primary mechanical transmission 32 may include a closure distance shifter 321,322,323 which is either blocked (e.g. not retracted and not retractable) or unblocked (e.g. retracted or retractable) depending on the direction of operation of drive output 30',31' when second part 20 is moved from the transfer position to the extraction position, as illustrated by comparison of FIGS. 2a to 5a with FIGS. 2b to 5b.

Secondary mechanical transmission 33 can be either blocked or unblocked depending on the direction of operation of the drive output 30',31' when second part 20 is moved from the transfer position to the extraction position, as illustrated by comparison of FIGS. 2a to 5a with FIGS. 2b to 5b.

Secondary mechanical transmission can have a first secondary mechanical transmission 33a and a second secondary mechanical transmission 33b that are alternatively blocked and unblocked depending on the direction of operation of the drive output 30',31' when second part 20 is moved from the transfer position to the extraction position, as in the embodiment illustrated in FIGS. 7 to 14b.

Mechanical transmission 32,33,33a,33b may include an automatic return means 322', such as a bias element, e.g. an automatic return spring 322',332a', 332b', for returning a mechanical transmission, such as a primary or a secondary mechanical transmission e.g. a first or second secondary mechanical transmission, for instance a closure distance shifter 321,322,323 or a first or second relative position shifter 330a,331a,332a; 330a,331a,332a to a reference configuration; and/or a retainer, such as a protruding face 321',330a',330b', 333a', interfering with a counter-retainer, such as a hook 1a,1a',1b',1a1', e.g. a counter-retainer fixed to frame 1', for bringing mechanical transmission 32,33, 33a,33b to a reference configuration, as illustrated in FIGS. 1, 9b'-11b' and 12a-13a' and 12b-13b'.

Handling device 1' can be configured to handle a first capsule 2a of first dimensions 2da,2ha as well as a second capsule 2b of second dimensions 2db,2hb different to these first dimensions (e.g. different first and second capsule diameters 2da,2db and/or different first and second capsule heights 2ha,2hb), first and second portions 21a,21b of second part 20 delimiting:

in their first relative position, cavity 21' and extraction chamber 21" with first dimensions 21da,21ha for receiving and extracting first capsule 2a; and in their second relative position, cavity 21' and extraction chamber 21" with second dimensions 21db,21hb for receiving and extracting second capsule 2b such as second dimensions 21db,21hb that are smaller than first dimensions 21da,21ha.

For instance, chamber 21" in this first relative position being dimensionally unfit to hold second capsule 2b for extracting it and/or chamber 21" in this second relative position being dimensionally unfit to hold first capsule 2a for extracting it.

Alternatively, first and second portions 21a,21b of second part 20 may delimit in their first and in their second relative positions, cavity 21' and extraction chamber 21" of different dimensions for adjusting a confinement and/or a compression of a deformable and/or expandable capsule in chamber 21" to adjust the capsule extraction conditions.

The above described machines 1 may thus be combined with a capsule 2a,2b, such as a capsule selected from a set of a first capsule 2a having first dimensions 2da,2ha and a second capsule 2b having second dimensions 2db,2hb different to these first dimensions and which can both be handled and extracted in extraction chamber 21".

Figure 12A:
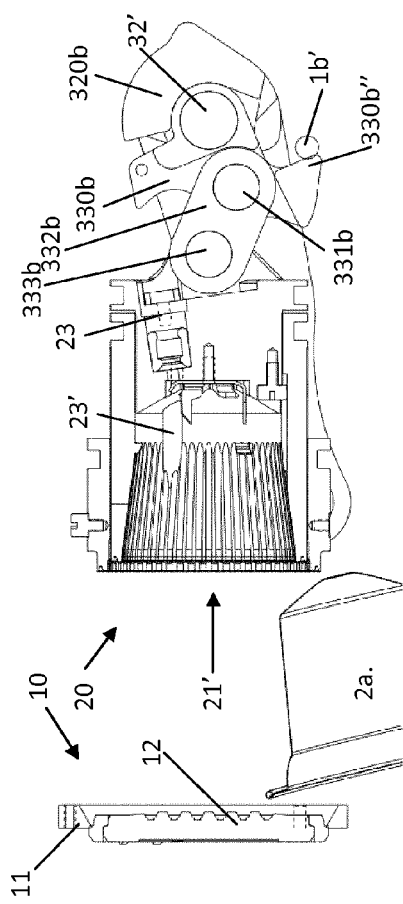
FIGS. 12a-12a' and 13a-13a' as well as 12b-12b' and 13b-13b' illustrate details of an opening sequence of this device handling a large capsule and a small capsule, respectively.
Figure 13A:
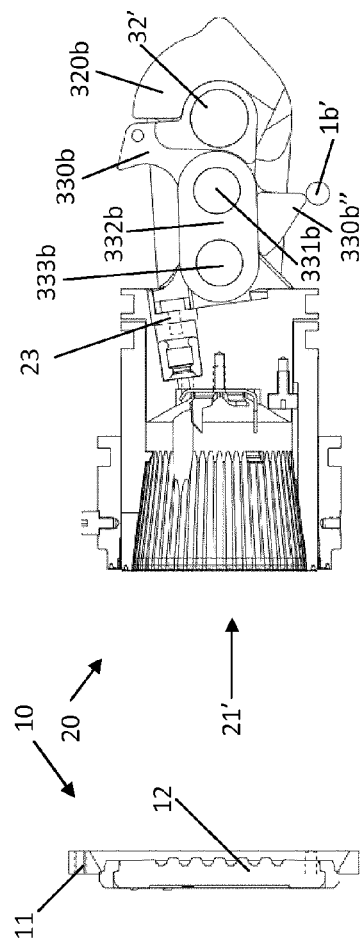
Figure 12A:
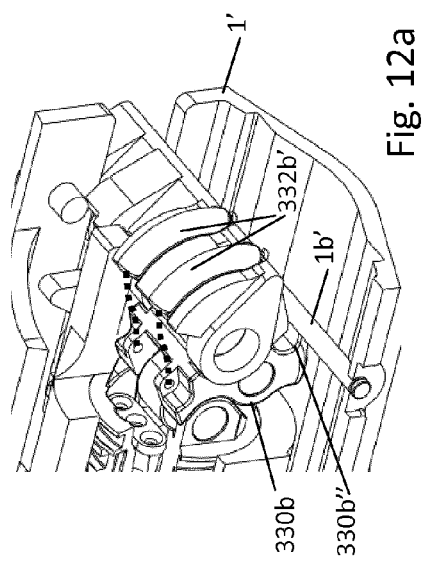
Figure 13A:
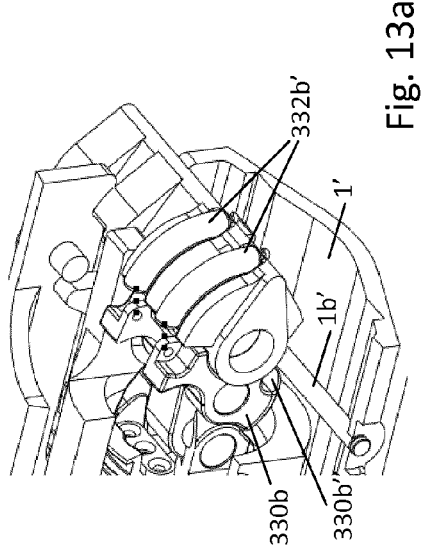
Figure 14:
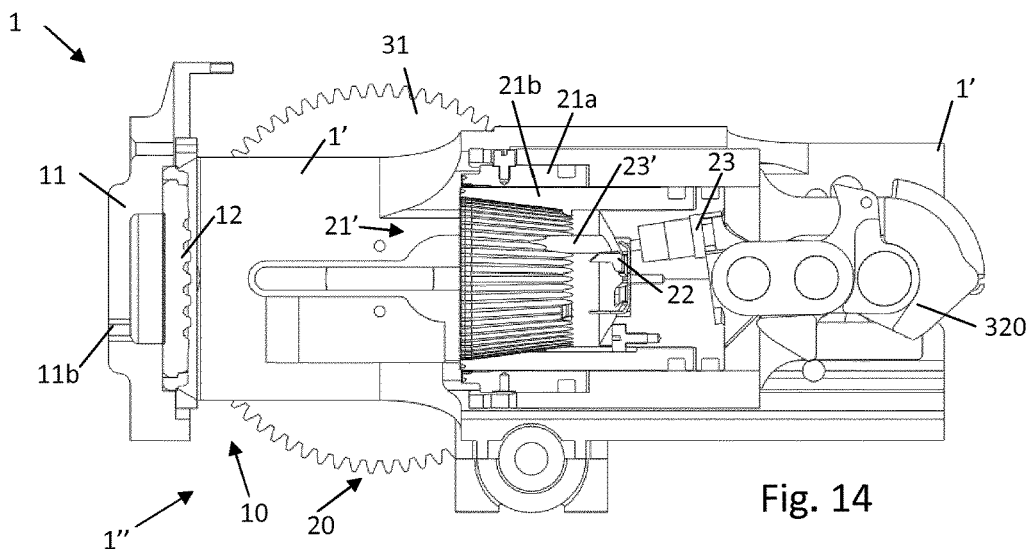
FIG. 14 is a vertical cross-sectional view of this handling device when open, FIGS. 14a and 14b illustrating the closed device in a configuration for handling a large capsule and a small capsule, respectively.
Figure 14A:
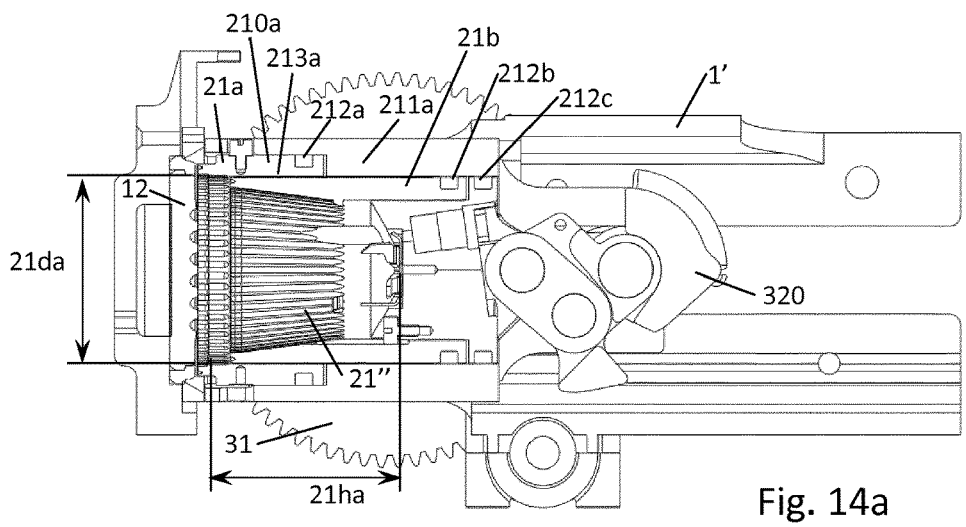
Figure 14B:
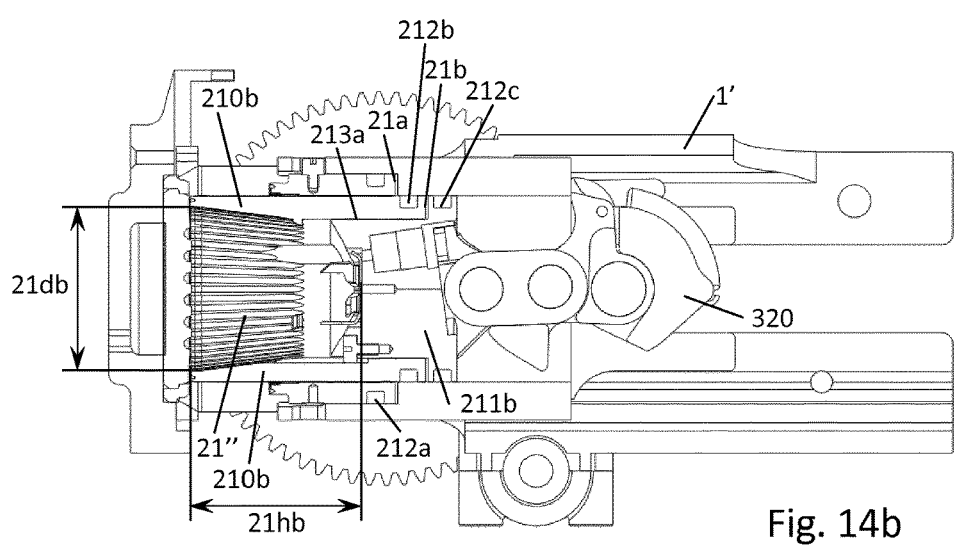

During handling in machines 1, the following steps can be carried out:

capsule 2a,2b can be immobilized between first and second parts 10,20 when second part 20 is in its transfer position (FIGS. 2a, 2b, 8a and 8b);

second part 20 can be moved by actuator 30,300 to the extraction position, whereby when needed a relative movement of first and second portions 21a,21b of second part 20 between their first and second relative positions can be driven by actuator 30,300 (FIGS. 3*a*-5*a*, 3*b*-5*b* and FIGS. 9*a*-11*a*, 9*b*-11*b*); and capsule 2*a*,2*b* can be extracted in the thereby formed extraction chamber 21" (FIGS. 5*a*,5*b*,11*a* and 11*b*);

actuator 30,300 can move second part 20 to the transfer position, whereby when needed a relative movement of the first and second portions 21*a*,21*b* of second part 20 can be driven by actuator 30,300 (FIGS. 12*a'*-13*a'* and FIGS. 12*b'*-13*b'*); and extracted capsule 2*a*,2*b* can be removed (FIGS. 12*a'* and 12*b'*).

Generally speaking, second part 20 of handling device 1" can be moved from the extraction position to the transfer position (first and second portions 21*a*,21*b* of second part 20 being movable back into their relative position when second part 20 is in the transfer position, before or after or while second part 20 is moved to the transfer position) by generally reversing the movement (of second part 20 from the transfer to the extraction position and of first and second portions 21*a*,21*b* into the first or second relative position). Possible deviations during the reversing movement may result from the (optional) use of the abovementioned retainer and counter-retainer arrangements and similar arrangements.

It follows that capsule 2*a*,2*b*, e.g. a capsule selected from a set of a first capsule 2*a* having first dimensions 2*da*,2*ha* and a second capsule 2*b* having second dimensions 2*db*,2*hb*, can be used for: the above described machines; implementing the above described machine combined with capsule 2*a*,2*b*; or carrying out the above described capsule handling method.

The invention claimed is:

1. A machine comprising a frame and a capsule handling device configured to handle an capsule and mounted in and/or on the frame, the capsule handling device comprising:
    a first part;
    a second part that is movable relative to the frame from a transfer position for inserting and/or removing the capsule to an extraction position for extracting the capsule and vice versa, the second part comprising:
    a capsule receptacle defining a cavity for receiving the capsule and for forming in the extraction position an extraction chamber with the first part, and
    a first portion and a second portion that are relatively movable between a first relative position and a second relative position to change at least one dimension of the cavity and of the extraction chamber;
    an actuator connected to the second part for driving the second part between the transfer position and the extraction position, the actuator is connected to the first portion and/or the second portion of the second part to relatively move the first portion and the second portion between a first relative position and a second relative position; and
    a mechanical transmission connecting the actuator to the second part and to the first portion and the second portion of the second part for driving:
    the second part between the transfer position and the extraction position; and
    the first portion and/or the second portion of the second part to relatively move the first portion and the second portion between the first relative position and the second relative position.

2. The machine of claim 1, wherein the mechanical transmission comprises:
    a primary mechanical transmission for driving the second part between the transfer position and the extraction position; and
    a secondary mechanical transmission for driving the first portion and/or the second portion of the second part to relatively move the first portion and the second portion between the first relative position and the second relative position.

3. The machine of claim 2, wherein the primary mechanical transmission includes a closure distance shifter for adjusting a travelling distance of the second part between the transfer position and the extraction position depending on the relative position of the first portion and the second portion when the second part is in the extraction position.

4. The machine of claim 2, wherein the primary mechanical transmission has a dimensionally constant drive structure to maintain a constant travelling distance of the second part between the transfer position and the extraction position irrespectively of the relative position of the first portion and the second portion when the second part is in the extraction position.

5. The machine of claim 2, wherein the secondary mechanical transmission comprises a relative position shifter for relatively moving the first portion and the second portion.

6. The machine of claim 2, wherein the secondary mechanical transmission comprises a first relative position shifter connected to and driving the first portion and a second relative position shifter connected to and driving the second portion, the first relative position and the second relative position shifter arranged to relatively move the first portion and the second portion.

7. The machine of claim 2, wherein the actuator has a drive output that operates selectively in a first direction and in a second direction different to the first direction.

8. The machine of claim 7, wherein the second part is moved:
    via the primary mechanical transmission irrespectively of the first direction and the second direction of operation of the drive output while the first portion and the second portion of the second part are, via the secondary mechanical transmission, either:
    relatively moved to the first relative position or maintained in the first relative position
    or
    relatively moved to the second relative position or maintained in the second relative position,
    depending on the direction of operation of the drive output;
    and/or
    from the extraction position to the transfer position by the actuator irrespectively of the first direction and the second direction of operation of the drive output while the first portion and the second portion of the second part are relatively moved to an intermediate relative position by the actuator either from the first relative position or from the second relative position irrespectively of the first direction and the second direction of operation of the drive output or by reversing direction operation of the drive output vis-à-vis a direction of operation for bringing the first portion and the second portion into the first relative position or the second relative position and the second part into the extraction position.

9. The machine of claim 7, wherein at least one of the primary mechanical transmission and the secondary mechanical transmission is dimensionally either blocked or unblocked depending on the direction of operation of the drive output when the second part is moved from the transfer position to the extraction position.

10. The machine of claim 1, wherein the mechanical transmission comprises an automatic return member.

* * * * *